(12) United States Patent
Kurvers et al.

(10) Patent No.: US 10,959,303 B2
(45) Date of Patent: Mar. 23, 2021

(54) LIGHTING DEVICE AND CONTROL METHOD

(71) Applicant: SIGNIFY HOLDING B.V., Eindhoven (NL)

(72) Inventors: Markus Jozef Maria Kurvers, Eindhoven (NL); Bartel Marinus Van De Sluis, Eindhoven (NL); Bas Driesen, Eindhoven (NL); Berent Willem Meerbeek, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 31 days.

(21) Appl. No.: 16/475,112

(22) PCT Filed: Dec. 15, 2017

(86) PCT No.: PCT/EP2017/083096
§ 371 (c)(1),
(2) Date: Jun. 30, 2019

(87) PCT Pub. No.: WO2018/122010
PCT Pub. Date: Jul. 5, 2018

(65) Prior Publication Data
US 2019/0335560 A1    Oct. 31, 2019

(30) Foreign Application Priority Data
Jan. 2, 2017    (EP) .................................. 17150002.8

(51) Int. Cl.
*F21V 23/00*    (2015.01)
*H05B 45/20*    (2020.01)
*F21V 23/04*    (2006.01)
*F21Y 103/10*    (2016.01)
*F21Y 115/10*    (2016.01)

(52) U.S. Cl.
CPC ........... *H05B 45/20* (2020.01); *F21V 23/045* (2013.01); *F21Y 2103/10* (2016.08); *F21Y 2115/10* (2016.08)

(58) Field of Classification Search
CPC ... H05B 45/20; F21V 23/045; F21Y 2103/10; F21Y 2115/10
See application file for complete search history.

(56) References Cited

U.S. PATENT DOCUMENTS 9,125,274 B1 *    9/2015    Brunault ............. H05B 47/175
9,609,715 B1 *    3/2017    Petluri ................. H05B 45/24
(Continued)

FOREIGN PATENT DOCUMENTS

EP    079447 A1    5/1983
EP    2048869 A2    4/2009
(Continued)

OTHER PUBLICATIONS

Meyer, Eric A.: "Color Blender", Internet Citation, Oct. 11, 2007, p. 1, XP002525747.

*Primary Examiner* — Gerald J Sufleta, II

(57) ABSTRACT

A lighting device comprises an array of controllable light emitting pixels, each pixel having an adjustable light output colour. A controller is configured to receive a limited set of light output colours and to locally process these light output colours to form a colour gradient pattern to be displayed across pixels of the array.

15 Claims, 8 Drawing Sheets

(56) References Cited

U.S. PATENT DOCUMENTS

| | | | |
|---|---|---|---|
| 2004/0105261 A1 | 6/2004 | Ducharme et al. | |
| 2008/0065345 A1* | 3/2008 | Ooghe | H05B 45/22 |
| | | | 702/130 |
| 2008/0179497 A1* | 7/2008 | Maniam | G01J 3/51 |
| | | | 250/214 AL |
| 2008/0212873 A1* | 9/2008 | Allen | G06T 9/20 |
| | | | 382/162 |
| 2011/0273897 A1* | 11/2011 | Kojima | F21S 41/12 |
| | | | 362/510 |
| 2013/0278578 A1* | 10/2013 | Vetsuypens | G09G 5/02 |
| | | | 345/207 |
| 2015/0097879 A1* | 4/2015 | Reeves | G09G 5/02 |
| | | | 345/694 |
| 2015/0109774 A1* | 4/2015 | Deregibus | F21K 9/62 |
| | | | 362/231 |
| 2016/0262223 A1 | 9/2016 | Schevardo et al. | |
| 2017/0181243 A1* | 6/2017 | Weaver | H05B 45/24 |
| 2018/0342212 A1* | 11/2018 | Gorilovsky | H05B 45/20 |
| 2018/0376564 A1* | 12/2018 | Van De Sluis | H05B 47/175 |

FOREIGN PATENT DOCUMENTS

| | | |
|---|---|---|
| EP | 2321572 B1 | 2/2015 |
| WO | 2010004495 A2 | 1/2010 |
| WO | 2016009324 A1 | 1/2016 |
| WO | 2016096615 A1 | 6/2016 |
| WO | 2016166034 A1 | 10/2016 |

\* cited by examiner

LIGHTING DEVICE AND CONTROL METHOD

CROSS-REFERENCE TO PRIOR APPLICATIONS

This application is the U.S. National Phase application under 35 U.S.C. § 371 of International Application No. PCT/EP2017/083096, filed on Dec. 15, 2017, which claims the benefit of European Patent Application No. 17150002.8, filed on Jan. 2, 2017. These applications are hereby incorporated by reference herein.

FIELD OF THE INVENTION

This invention relates to a lighting device and control method for providing a lighting effect, and in particular for providing a lighting effect across an array of LED pixels.

BACKGROUND OF THE INVENTION

An area of increasing interest within the home decorative lighting market is that of pixelated LED strips which typically comprise a long, flexible cord or strip having a relatively dense array of LED pixels embedded extending along its length. The LEDs are typically controllable to output light across a broad spectrum of different colours. Such pixelated strips may be installed by users directly onto furniture, within recesses in walls or other surfaces, or hidden within furniture for example. They may be used to provide an atmospheric luminous effect within a room, or alternatively may be installed within a range of different luminaire structures to thereby provide a source of functional light within a room.

The individual addressability and colour change functionality of such LED lighting strips opens the possibility for a wide range of different control options to provide a variety of different interesting and attractive luminous effects.

One type of effect of particular interest is that of colour gradients, wherein a lighting strip is controlled to vary the colour outputs of LEDs between two defined points so as to gradually transition from a first colour at a first point to a second colour at a second point. A colour gradient effect is thereby created extending across the strip.

Creation of pre-stored gradient patterns across an LED strip is relatively straightforward, and simply requires a pre-defined set of colour mappings to be stored locally within the strip for controlling pixels to generate the pattern. However, of increasing interest is the ability to create customised colour gradient patterns.

One option for facilitating this is to create custom control regimes in accordance for instance within user input commands, on a remote computer or mobile device, and to remotely operate the lighting device in accordance with these control regimes via a suitable network link. However, such a method requires a network connection of relatively high bandwidth in order to continuously transfer new, updated control commands to the device. Where such bandwidth is not available, or is not reliably available, such control options are not possible.

Desired therefore is a lighting device or system which is capable of creating customisable colour gradient effects across a controllable array of LED pixels on the basis of a minimal amount of input control data.

It has been suggested, in WO 2016/096615, that a colour gradient effect across a pre-defined stretch of an LED strip might be customised by user-specification of start and end colours for the gradient pattern.

However, customisation possibilities remain highly limited with such approaches. It would be desirable to provide a lighting device or device capable of offering a greater level of customisability.

SUMMARY OF THE INVENTION

The invention is defined by the claims.

According to an aspect of the invention, there is provided a lighting device for providing a colour gradient light effect, comprising:

an array of light emitting pixels, each pixel having a controllable light output colour and an associated location within the array; and a controller configured to:

receive two or more light output colours;

form from the light output colour a pattern of colour points comprising two end points and at least one intermediate point;

generate a colour gradient pattern based on the pattern of colour points by interpolating further light output colours to populate regions of the gradient pattern in-between the colour points; and map output colours of at least a portion of the colour gradient pattern to pixels within the array, and control said pixels in accordance with the mapped output colours to thereby generate the colour gradient light effect across the array;

wherein the controller is further configured to receive pattern configuration information comprising one or more constraints, and wherein the pattern of colour points and/or the colour gradient pattern is generated based on said constraints.

Embodiments of the invention thus provide a lighting device capable of generating a custom colour gradient pattern based on a set of at least two received light output colours, which may be received via a (wireless) network interface from a further device (e.g. a smartphone, a bridge, a remote server, etc.), and controlling an array of light emitting pixels to display the thus generated pattern. The controller is configured to devise a spatial pattern of colour points comprised from the two or more received output colours, and to form the gradient pattern based on this pattern of points. In particular, the controller may assign each of the received colours one or more location points within a pattern space, and form a pattern of colour points based on these assigned location values. The thus formed pattern of colour points provides a skeleton or frame based upon which the full gradient pattern may then be created. In particular, the controller interpolates an ordered set of further light output colours for filling spaces between each of the assigned colour points, the further colours together defining a gradated transition between each pair of neighbouring colour points.

By providing a pattern having two end points and at least one intermediary point, embodiments are capable of generating gradient patterns having a wide variety of different particular spatial configurations. Customisability is greatly increased. By varying the location of the intermediate point relative to the two end points, the visual character of the pattern may be dramatically altered.

In particular cases where the system receives only two light output colours, the controller is configured to perform a further one or more processing steps in order to form from the received colours a pattern of at least three colour points (comprising two end points and at least one intermediate point). This may in examples comprise duplicating or repeating certain of the received light output colours in more than one point, or may comprise interpolating or determining a further one or more colour points based upon the received set of light output colours. These options will be described in greater detail in passages to follow.

The term 'colour gradient' is a term of the art and is to be interpreted in accordance with its commonly understood meaning. In particular, a colour gradient (or colour progression or colour ramp) refers generally to a range of colours extending across a corresponding range of consecutive positions within a space, and having colours which progress or transition from at least a first colour to at least a second colour.

The controller is further configured to receive pattern configuration information, which may be received via a (wireless) network interface from a further device (e.g. a smartphone, a bridge, a remote server, etc.), comprising one or more constraints, and wherein the pattern of colour points and/or the colour gradient pattern is generated based on said constraints. Said constraints may in particular non-limiting examples (to be described in greater detail in passages to follow) include pattern locations for one or more of the received light output colours, locations of one or more mid-points of the colour gradient pattern and/or a smoothness parameter, defining a smoothness of a colour transition provided by at least a portion of the further light output colours. Advantageously, a lighting device is provided which is capable of creating colour gradient effects across a controllable array of LED pixels on the basis of a minimal amount of input control data.

For at least a subset of embodiments of the invention, it is envisaged that the array of light emitting pixels controlled by the system are pixels distributed along the length of an elongate lighting strip. In these cases, the pattern of colour points may be a linear pattern, extending in a single dimension only (a dimension, which when mapped to the array of light emitting pixels, is aligned parallel with the length of the elongate lighting strip).

However, the concept of the invention is not limited to these embodiments. It is envisaged that the array of light emitting pixels may be comprised by any of a range of different forms of lighting device, and may extend to define a more two-dimensional arrangement. In this case, the pattern of colour points may be a two-dimensional pattern. For these examples, an 'intermediate point' may be understood as a point falling anywhere along a straight line extending between said two end points.

It is noted that although in the case of the system comprising an elongate lighting strip, it is envisaged that the pattern of colour points may be a one-dimensional pattern, the array of light emitting pixels may in fact be two dimensional, extending both longitudinally along a length of the at least one strip, and laterally along a width. To simplify generation of the colour gradient pattern, the same colour may be mapped to all pixels occupying the same lateral column (/row).

In accordance with one or more embodiments, the system may comprise a plurality of elongate lighting strips, the array of light emitting pixels being distributed across the plurality of lighting strips. The plurality of lighting strips may in this case be operatively coupled with the controller, and the controller operable to provide coordinated control of the light emitting pixels of the totality of lighting strips to thereby provide the lighting effect. The colour gradient pattern may be controlled to spread across the plurality of lighting strips for instance. The plurality of lighting strips may be physically arranged in a particular spatial configuration, for instance to define a shape or pattern. This spatial configuration may be communicated to the controller and utilised in forming the colour gradient pattern, so as to form a pattern which fits spatially and aesthetically with the physical arrangement of the strips.

The light emitting pixels may each comprise one or more light sources or light emitting elements configured to enable each pixel to emit light of any of a range of different light output colours. In preferred examples, each light emitting pixel may have individually controllable light output intensity.

In accordance with a particular set of one or more embodiments, the light emitting pixels may comprise LED pixels. Such LED pixels may each comprise one or more LED light sources configured to enable each LED pixel to emit light of any of a range or spectrum of different light output colours. In preferred examples, each LED pixel is operable to emit light across the full visible light spectrum. The LED pixels may in examples comprise RGB (red, green, blue) LEDs, which are characterised in comprising red, green and blue LED elements encapsulated in a single unit and sharing a common anode. Preferably, each LED pixel has a controllable light output intensity (or output power) in addition to a controllable light output colour.

Although LED pixels represent one example of a suitable light emitting pixel, in further examples the pixels may be of a different variety. The pixels may comprise light sources of a different variety, for instance a different kind of solid state light source, or any other kind of light source. The light emitting pixels may be a different kind of electroluminescent pixel for example.

As noted above, the controller is configured to receive pattern configuration information comprising one or more constraints, and to form the pattern of colour points and/or the colour gradient pattern at least partly based on said constraints.

In accordance with one or more embodiments, the pattern configuration information may comprise colour position information defining pattern locations for one or more of the received light output colours. The constraints in this case comprise said pattern locations for said one or more of the received light output colours, and the controller is configured to form the pattern of colour points at least partly on the basis of these defined locations.

Optionally, said colour position information may in particular be received from:

a user interface being communicably coupled with the controller; and/or one or more sensors being communicably coupled with the controller.

The colour position information may specify a relative or absolute positioning of one or more of the received light output colours. The colour positioning information may specify a plurality of locations points associated with one or more of the received light output colours. Based on this position information, the pattern of colour points is formed accordingly, with the positioning of at least a portion of the colour points directed or informed by the received colour position information.

The position information may be relative, for instance specifying a relative spacing of the light output colours (as manifested in respective colour points) along a dimension of the array of light emitting pixels.

In the absence of any received colour position information, the controller may be configured to locally determine a positioning of the light output colours (as respective colour points) within the pattern of colour points. This may be based on a pre-programmed set of default positioning arrangements, or may be uniquely generated or determined in each new instance of forming a pattern of colour points.

In at least some examples, the controller, in the absence of received colour position information, may be configured to form an evenly spaced pattern of colour points from the two or more light output colours.

Colour position information may be specified by a user by means of a suitable user interface device. Alternatively, the information may be received from one or more sensors. The sensors may for instance be pressure sensors configured to identify bends or folds in an elongate lighting strip comprising the array of pixels, to thereby determine natural 'endpoints' for any gradient pattern. Other sensors may also be used (e.g. light sensors) to similarly determine an aspect of the physical arrangement or structural configuration of the array of light emitting pixels to thereby identify suitable anchor points for locating one or more of the colour points of the pattern.

The controller may be configured to form the pattern of colour points partly on the basis of received colour position information and partly on the basis of locally determined positioning information.

Additionally or alternatively, in accordance with one or more examples, the constraints comprised by the pattern configuration information may include locations of one or more mid-points of the gradient pattern, mid-points representing mid-points in a colour transition from a first colour point to a second colour point. For example, a received constraint might indicate that a mid-point should be located 25% of the way between a first specified colour point and a second specified colour point. The controller may then be configured to interpolate the further light output colours between said specified colour points such that at a point 25% of the way between these two colours, the colour of the gradient pattern changes from being predominantly of the first colour to being predominantly of the second colour. Of course, 25% represents just one example of a location for a mid-point, and in further examples, constraints may specify any relative or absolute location of such a mid-point.

Additionally or alternatively, in accordance with further examples, the one or more constraints may comprise a smoothness parameter, defining a smoothness of a colour transition provided by at least a portion of the further light output colours.

The smoothness of a colour transition may be determined by the number of further light output colours forming the colour transition. In particular, a large number of further colours populating the transition will provide a smoother colour transition; a smaller number of further colours will provide a more disjointed or discretised colour transition. A high density gradient pattern comprising a large number of transitionary colours provides a high resolution (or smooth) gradient pattern, a low density pattern provides a lower resolution (or less smooth) gradient pattern.

In accordance with one or more subsets of embodiments, forming the pattern of colour points may comprise sorting the received light output colours in accordance with one or more colour properties and assigning pattern location points to each of the output colours on the basis of said sorting.

In particular examples, the light output colours may be sorted in accordance with at least one of: colour hue; saturation; and perceived brightness; and pattern location points then assigned to each of the light output colours on the basis of said sorting. The light output colours may be arranged into a suitable order based on their colour hue, saturation or perceived brightness. Suitable numerical codifications of colour hue for enabling ordering will be known to the skilled person and include for instance HSB/HSL encodings based on the RGB colour model. Perceived brightness may be quantified in examples in terms of lightness as understood within the field of colorimetry and color theory and as defined for instance by values or representations within CIE colour space. Perceived brightness may additionally or alternatively be quantified in further examples by relative luminous intensity (wavelength-weighted power) of the colours, assuming each colour will be illuminated with a uniform absolute output power.

In accordance with one or more sets of embodiments, the controller may be configured to form a pattern of colour points which comprises a recurring sequence of colour points. The controller may be configured for instance to determine an initial ordered arrangement or sequence of colour points based on the received light output colours and then to form an extended recurring pattern of colour points by duplicating the initial sequence a plurality of times.

In accordance with one or more sets of embodiments, the pattern of colour points may be formed so as to comprise a colour symmetrical pattern of colour points, with points equidistant in any direction from a defined one or more central colour points being of the same colour. For instance, where the pattern of colour points is formed as a linear pattern, extending along one dimension only, the colour symmetrical pattern may comprise one or more central colour points with equidistant points on either side being of the same colour.

In accordance with one or more sets of embodiments, the controller may be configured to control the array of light emitting pixels to provide a dynamic colour gradient light effect by recurrently selecting and mapping different linear portions of the colour gradient pattern to the array at regular time intervals.

For example, the controller may first generate a full colour gradient pattern based on the full set of colour points of the pattern of colour points. The controller may then repeatedly select different limited sections or regions of the pattern to map and display across the array of the light emitting pixels. This generates a dynamic or moving colour gradient light effect which is more engaging and interesting to on-looking observers.

In particular examples, the controller may be configured to select and map sequentially consecutive portions of the colour gradient pattern to the array of pixels, to thereby generate a moving colour gradient light effect, and optionally wherein the controller is configured to reverse a direction in which the consecutive portions are sequentially selected upon reaching an end point of the colour gradient pattern.

In these examples, the controller effectively executes a sweep across the full colour gradient pattern, recurrently mapping the light output colours of a moving section of the colour gradient pattern to the array of light emitting pixels. This moving mapping action generates the effect of a moving gradient pattern, with the displayed pattern appearing to progress linearly along the length of the array. The sweep across the gradient pattern may be reversed upon reaching an end-point of the pattern, thereby creating a 'bounce' effect in the pattern displayed on the array of light emitting pixels.

Additionally or alternatively, other dynamic mapping actions may also be considered. In accordance with at least one set of examples, the controller may be configured to pre-process each selected portion of the colour gradient pattern in advance of mapping, the pre-processing comprising mirroring the pattern portion about an end-point to thereby generate a centrally symmetric colour gradient pattern portion for mapping to the array. This may be combined with the sweeping action described above, to create the apparent effect of the gradient pattern moving outwards from a centre point within the array.

In accordance with any of these examples, the controller may be configured to receive dynamic control information, wherein the selection and subsequent mapping of the different linear portions is at least partly based on said dynamic control information. The dynamic control information may include user input commands providing for example an indication of a particular dynamic control mode to execute. The controller may contain a number of pre-stored dynamic mapping programs, and wherein the dynamic control information may be used to inform which of the programs to execute in controlling the array of light emitting pixels.

Dynamic mapping options have been described above which consist in generating a single colour gradient pattern and then recurrently selecting different portions of this single pattern to map to the array of pixels. By modifying or altering the mode or pattern by which successive portions of the colour gradient pattern are selected, different dynamic colour gradient light effects are achievable.

In accordance with at least a second set of embodiments, a dynamic colour gradient light effect may be achieved through a different control means. In particular the controller may be configured to control the array of light emitting pixels to provide a colour gradient dynamic light effect by recurrently:

receiving updated colour position information and/or light output colours;

altering the pattern of colour points accordingly;

regenerating the colour gradient pattern based on the altered pattern of colour points; and mapping output colours of the regenerated colour gradient pattern to the array of light emitting pixels.

Hence, in these examples, rather than generating a single colour gradient pattern and then sequentially mapping different limited portions of it to the array, the controller is configured to recurrently generate a new colour gradient pattern at regular time intervals, these new patterns each being based on an updated set of colour information, received recurrently at the controller. At each interval, a new pattern of colour points is formed, and intervening colours interpolated to complete the full gradient pattern.

In a variant set of examples, the controller may be configured to receive an initial set of light output colours and/or colour position information, along with control instructions relating to a set of one or more colour transitions to be performed for each colour point of the pattern of colour points at each of a set of future time intervals. At each new time interval, the controller consults the received control instructions to determine how the pattern of colour points should be altered. The colours of each of the colour points are changed in accordance with the instructions, and based on the updated pattern of colour points, a new colour gradient pattern interpolated and mapped to the array of light emitting pixels.

These and other control options will be described in greater detail in sections to follow.

Examples in accordance with a further aspect of the invention, provide a method of controlling an array of light emitting pixels of a lighting device to generate a colour gradient light effect, each pixel of the array having a controllable light output colour and an associated location within the array, and the method comprising, at the lighting device:

receiving two or more light output colours;

forming a pattern of colour points from the received light output colours;

generating a colour gradient pattern based on the pattern of colour points by interpolating further light output colours to populate regions of the gradient pattern in-between the colour points; and mapping output colours of at least a portion of the colour gradient pattern to pixels within the array, and controlling said pixels in accordance with the mapped output colours to thereby generate the colour gradient light effect across the array, wherein the method further includes receiving pattern configuration information comprising one or more constraints, and wherein the pattern of colour points and/or the colour gradient pattern is generated based on said constraints.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides a lighting device comprising an array of controllable light emitting pixels, each pixel having an adjustable light output colour. A controller is configured to receive a limited set of light output colours and to locally process these light output colours to form a colour gradient pattern to be displayed across pixels of the array. In particular, each of the light output colours is assigned one or more locations in a pattern of colour points, and further light output colours then interpolated to fill the spaces of the pattern in between. The further light output colours are selected by the controller to collectively describe a colour gradient across the extent of the pattern. The pattern is then mapped to the array of light emitting pixels, and the array controlled in accordance with the mapping.

In accordance with particular examples, the light emitting pixels may be LED pixels. Examples are described below in which LED pixels are utilised in particular. However, this is by way of simple illustration only, and it is to be understood that in each case the concept described may be applied to arrays comprising a different kind of light emitting pixel. These may include other kinds of solid state light source pixels or other kinds of electroluminescent pixel for instance.

Figure 1:
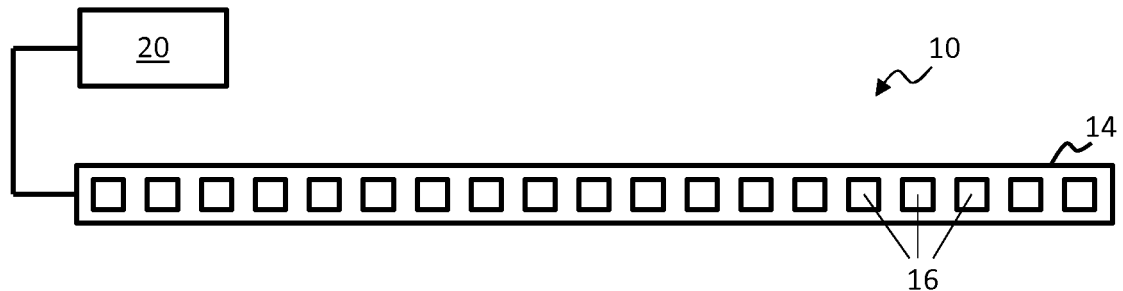
FIG. 1 shows a first example lighting device in accordance with one or more embodiments of the invention.

FIG. 1 schematically illustrates the basic device architecture of a simple example lighting device 10 in accordance with one or more embodiments of the invention. The system comprises an elongate LED lighting strip 14, the strip comprising an array of LED pixels 16 distributed along its longitudinal length. A controller 20 is provided operatively coupled to the LED lighting strip, and operable to control the luminous output of each of the array of LED pixels. Preferably, each LED pixel is independently controllable.

The LED pixels 16 each comprise one or more LED light sources configured to enable each LED pixel to emit light of any of a range or spectrum of different light output colours. In preferred examples, each LED pixel is operable to emit light across the full visible light spectrum. The LED pixels may in examples comprise RGB (red, green, blue) LEDs, which are characterised in comprising red, green and blue LED elements encapsulated in a single unit and sharing a common anode. Preferably, each LED pixel has a controllable light output intensity (or output power) in addition to a controllable light output colour.

Although in the example of FIG. 1, the array of LED pixels 16 comprises only a single row, in further examples, a two-dimensional array may alternatively be provided.

The elongate lighting strip 14 may be composed of a flexible material to enable bending or shaping of the lighting strip without damaging the LED pixels 16 mounted upon it. This enables for example shaping of the LED lighting strip around furniture or other objects, and also enables the formation of custom lighting shapes and configurations (e.g. a circle or loop-shaped light source).

The LED pixels 16 may be embedded within the body of the lighting strip 14 (optically coupled with the surface via a suitable light transmissive material) or may be provided mounted to a surface of the strip.

In most preferable cases, the LED lighting strip 14 may comprise at least 100 LED pixels 16 per row per metre.

Although in the example of FIG. 1, the system 10 comprises only a single lighting strip 14, in alternative examples, a plurality of lighting strips may be provided operatively coupled to the controller 20. The controller may be configured to control the plurality of lighting strips collectively so as to together exhibit the colour gradient effect. In this case, the array of LED pixels 16 may be understood as being jointly distributed across the whole set of lighting strips 14 connected to the controller 20.

As discussed above, the controller 20 is configured, in a simplest example, to receive a set of two or more light output colours and to process the colours to form and map to the LED lighting strip a colour gradient pattern comprised of at least three basis colours between which the pattern transitions.

A simple first example control mode will now be described in detail with reference to FIG. 2.

In accordance with this first example control mode, the controller 20 is configured to receive an indication of at least two light output colours, based upon which the gradient pattern is to be formed. In the present example, a set of three light output colours 22 are received by the controller (labelled C1, C2 and C3 respectively).

Receiving the light output colours 22 may in examples comprise receiving a data message containing an indication of the set of two or more light output colours. The data message may be received via a (wireless) network interface, for example via ZigBee, Bluetooth or Wi-Fi. The data message may comprise an indication of the pattern configuration information comprising the one or more constraints The light output colours 22 may be input by a user. In this case, the controller may be communicatively coupled with a suitable user interface device, or may be connected via a suitable data network link with a computer or mobile computer device by means of which a user may specify the set of input colours 22.

In accordance with further examples, the lighting strip 14 may comprise one or more sensors, and wherein the system 10 comprises a further processing unit for determining, on the basis of outputs of one or more of the sensors, the set of two or more light output colours 22. The further processing unit may be communicatively coupled with the controller 20, and configured to output the determined or selected set of colours to the controller. The further processing element may in particular examples be comprised by the controller itself, and/or may be a notional further processing unit whose functions are fully performed by the controller 20 itself.

The one or more sensors may, by way of illustrative example only, be temperature sensors, and wherein the further processing unit is configured to select the two or more light output colours 22 on the basis of a sensed ambient temperature around the lighting strip. For instance, redder colours might be selected in warm temperatures, and bluer colours in cold temperatures (i.e. or vice versa, in order to provide colour outputs that contrast with the ambient temperature).

After receiving the two or more light output colours 22, the controller 20 is then configured to form the colours into a pattern 24 of at least three colour points, the colour points including at least two end points 26, 28 and one intermediate point 32. The controller may define a single colour point in the pattern for each of the received light output colours, or may define a plurality of colour points for at least one of the received light output colours. In particular, where only two colours 22 are received by the controller, it may be necessary to assign at least two colour points in the pattern 24 to at least one of the received colours 22.

In forming the pattern 24 of colour points, the controller is adapted to associate each of the received light output colours 22, with one or more fixed locations within the space of the pattern 24 to be formed. Once colours have been assigned to locations within the pattern space, colour points may then formed or associated or located at each of those locations within the pattern, to thereby form the complete pattern 24 of colour points 26, 28, 32.

In determining locations for associating each of the received light output colours 22, the controller 20 may be configured to receive colour position information, based upon which the locations are determined. The colour position information may include a set of one or more colour point locations to be associated with one or more of the received colours. The position information may include positions for each of the received light output colours 22, or only a subset of them.

Colour position information, in examples, may be input by a user. Here, the controller may be operatively coupled with a suitable user interface unit by means of which a user may input locations for a set of colours. Alternatively the controller may be connected via a suitable data network link with a computer or mobile computing device for outputting user selected colour position information. A user may in examples input relative positioning information for the two or more light output colours 22, for example specifying relative distances between the colours, or specifying by means of a percentage how far along the pattern 24 one or more of the light output colour 22 should be positioned.

In further examples, a user may in examples specify one or more physical locations along the extent of the LED lighting strip 14 for locating one or more of the light output colours 22. In this case, a further processing unit may be provided operatively coupled with the controller 20 and adapted to determine from the input physical locations the corresponding points within the space of the pattern 24 for positioning each of the light output colours 22. As explained previously, this further processing unit may in examples be separate to the controller 20 or may be comprised by the controller 20.

In accordance with one or more sets of examples, the lighting strip 14 may comprise one or more sensors, and wherein the system comprises a further processing unit for determining, on the basis of outputs of one or more of the sensors, locations within the pattern 24 space for associating each of the received light output colours 22. The further processing unit may be communicatively coupled with the controller, and configured to output the determined or selected position information to the controller. The further processing element may in particular examples be comprised by the controller itself.

The one or more sensors may, by way of illustrative example only, be pressure or tension sensors, adapted to sense points of bending or flexing of the lighting strip 14. These points might provide natural break or division points about which the final gradient pattern 48 might be formed. They may therefore make suitable locations for colour points 26, 28, 32 of the pattern 24 to map onto.

The further processing unit may therefore determine and output locations for associating each of the light output colours 22 such that when the final gradient pattern 48 formed from the pattern of colour points 24 is mapped onto the lighting strip, these determined locations map substantially onto these physically sensed locations of bending or tension. In determining these locations, it may for example be assumed that the full pattern 24 of colour points formed by the controller will simply be mapped across the full controllable extent of the LED lighting array(s) 14, such that determining locations correspondent with physically sensed points of tension or pressure is simply a matter of scaling the physical position information of the sensors onto the space of the pattern of colour points 24.

In accordance with a further set of one or more embodiments, the positioning of each of the three or more colour points 26, 28, 32 within the space of the pattern 24 of colour points may be determined entirely locally without receipt by the controller of colour position information from external sources. In the absence of any received colour position information, the controller 20 may for example be adapted to order or arrange the received light output colours 22 within the pattern of colour points 24 in accordance with one or more predetermined positioning algorithms or patterns. For instance, in the absence of any received colour positioning information, the controller 20 may be configured to order or sort the light output colours on the basis of colour hue, saturation or (perceived) brightness, and then to simply associate each of the received light output colours 22 with equally spaced location points across the pattern space 24.

Figure 2:
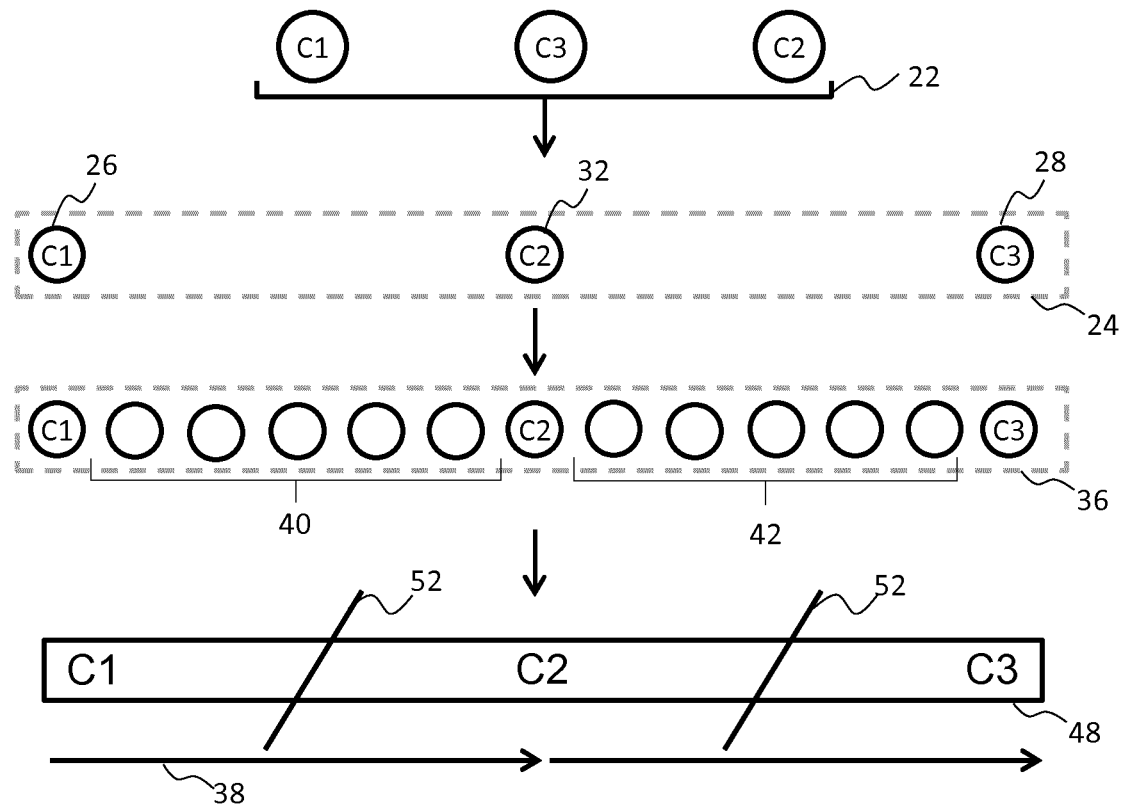
FIG. 2 schematically illustrates example control steps performed by a controller in generating an example colour gradient pattern in accordance with one or more embodiments.

This simple example is illustrated in FIG. 2, in which it is assumed that the controller 20 receives no colour position information. The controller first sorts the received light output colours 22 in accordance with colour hue and then arranges them to form the pattern of colour points 24. The pattern of colour points in this case is therefore formed comprising a first (end) colour point 26 associated with light output colour C1 and positioned at a location 0% of the way along the pattern 24, a second (intermediate) colour point 32 associated with light output colour C2 and positioned at a location 50% of the way along the pattern 24, and a third (end) colour points 28 associated with light output colour C3 and positioned at a location 100% of the way along the pattern 24.

Sorting the colours by colour hue may be performed in accordance with any standardly known colour hue model, such as for instance a CIE model (e.g. CIELAB or CIELUV) or an HSB/HSL model. Sorting by colour hue may for instance be achieved by identifying the shortest path in CIE xy or CIE u'v' colour space. In alternative examples, it may be achieved by finding the shortest path along h (hue angle) using the CIE Lch colour space. This may enrich the colour pattern formed, since, by this method, new colours are introduced in-between the received colours. Once the ordering is determined, more specific positioning of the colour points may then be determined.

The thus formed pattern 24 provides a skeleton or framework around which the full colour gradient pattern is then formed by the controller. In particular, each of the colour points 26, 28, 32 acts as a fixed colour anchor point between which the remainder of the colour gradient pattern will transition.

After assigning positions for each of the received light output colours 22 to form the pattern of colour points 24, the controller is then configured to interpolate one or more sets of further light output colours 40, 42, to fill the remainder of the pattern space extending between each of the anchor colour points 26, 28, 32. The further light output colours are selected by the controller so as to form a colour gradient extending between each neighbouring pair of fixed colour points 26, 32, 38. These fixed colour points 26, 32, 38 and interpolated colour points 40, 42 together form a full gradated pattern of colour points 36 which collectively define a colour gradient pattern 48 extending across the extent of the pattern length.

The colour gradient pattern 48 thus formed by the further interpolated light output colours is illustrated schematically in FIG. 2. The inclined lines 52 represent 'mid-points' of the colour gradient pattern, at which the further interpolated light output colours 40, 42 are mid-way between transitioning from colour C1 to C2 and colour C2 to C3 respectively. These mid-points effectively represent the points at which the further interpolated light output colours 40, 42 of each intermediary section transition from being predominantly of colour C1 (or C2) to being predominantly of colour C2 (or C3). Arrows 38 schematically illustrate the transition of the colours of the pattern from colour C1 to colour C2 and then from colour C2 to colour C3.

Interpolating the further light output colours 40, 42 to populate the remainder of the pattern of colour points (illustrated by pattern 36) may be performed in accordance with any standard interpolation process known in the art. In particular, methods for interpolating comprehensive colour gradients between a number of defined colour points are well known, and may be found for example as features of any basic desktop graphics application. Methods and algorithms for interpolating colour gradient patterns will be immediately apparent to the skilled person in the present field.

After forming the colour gradient pattern 48 by means the full gradated pattern of colour points 36, the controller 20 is configured to map the output colours of the gradated pattern to pixels of the array of LED pixels 16. In particular examples, each one of the set(s) of colour points 26, 32, 38, 40, 42 may be mapped to a unique single pixel 16 of the array. However, this is only possible if the number of pixels in the array exactly matches the number of colour points in the gradated pattern 36. In further examples, one or more of the colour points may be mapped to a plurality of pixels.

In further examples, there may be a greater number of colour points in the gradated pattern 36 than there are pixels 16 in the array of pixels. In this case, some of the colour points may need to be discarded by the controller 20, or alternatively the controller may be configured to amalgamate two or more neighbouring colour points by determining an 'average' colour point representing a 'median' colour falling between the two or colour points.

Once the colour points of the colour gradient pattern 48 have been mapped to pixels 16 of the array, the controller 20 is then configured to execute control of the array in accordance with the mapped colours to thereby display the colour gradient pattern 48 across the array.

Figure 3:
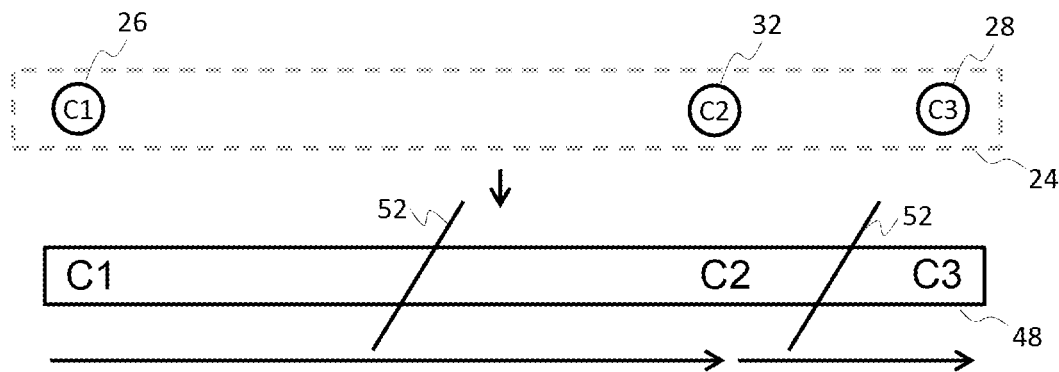
FIG. 3 schematically illustrates example control steps performed by a controller in generating a further example colour gradient pattern in accordance with one or more embodiments.

As noted above, the controller 20 may arrange the pattern of colour points 24 on the basis of received colour position information. By way of example, colour position information might for instance specify that colour C1 should be positioned 0% of the way along the pattern 24, colour C2 70% along, and colour C3 100% of the way along. This example is illustrated schematically in FIG. 3.

In this case, the controller is configured to form the pattern of colour points 24 in accordance with these designations, so that colour C2 (colour point 32) is closer to colour C3 (colour point 28) in the pattern than to colour C1 (colour point 26). By consequence, in interpolating the further light output colours 40, 42 to populate intermediary regions between the colour points 26, 28, 30, more colour points may be interpolated and located between colour C1 and C2 than between colour C2 and C3.

The further light output colours together define a colour gradient pattern 48 in which the transition from colour C1 to C2 occupies ¾ of the pattern and the transition from colour C2 to C3 occupies only ¼ of the pattern.

Although for this example, colour position information is specified in terms of percentages, in further examples, positions may be specified by means of any suitable representation. The position information may be absolute or relative in different examples.

An uneven spacing of the received light output colours 22 may be preferred in some cases, for example to compensate for off-centre placement of the LED lighting strips(s), or to compensate for a parallax in the viewpoint of an observer.

In forming the pattern of colour points, the controller is in all embodiments configured to receive some form of pattern configuration information comprising one or more constraints for informing generation of said pattern of colour points 24 or said colour gradient pattern 48. The pattern configuration information may be received via a (wireless) network interface, for example via ZigBee, Bluetooth or Wi-Fi. The pattern configuration information may comprise colour position information defining pattern location points for received light output colours, as described above and schematically illustrated in FIG. 3.

Additionally or alternatively, in accordance with one or more examples, the pattern configuration information may comprise an indication of locations of one or more gradient mid-way points 52 for the pattern. As discussed above, mid-way points are to be understood as locations of the pattern situated mid-way along a transition from any first colour point to any neighbouring colour point.

Figure 4:
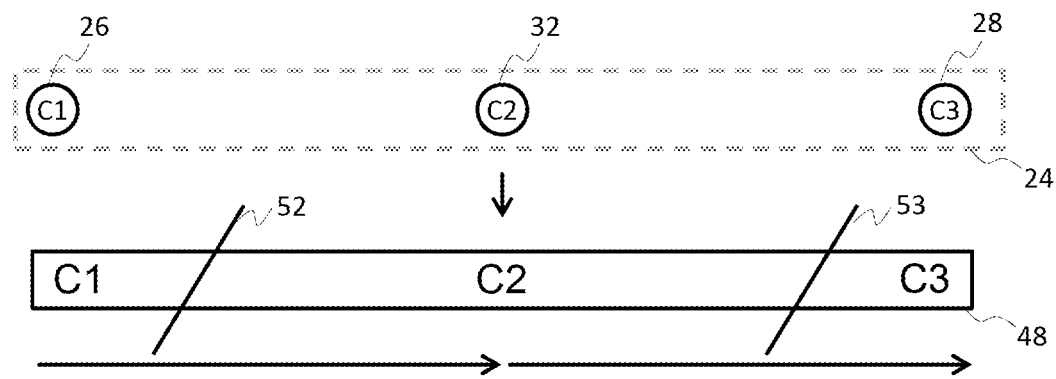
FIG. 4 schematically illustrates example control steps performed by a controller in generating a further example colour gradient pattern having off-centre mid-way points.

An example control mode in which such pattern configuration information is received is illustrated schematically in FIG. 4. Here, it is assumed that the controller 20 receives three light output colours (C1, C2, C3) and colour position information specifying locations for the three colours of 0%, 50% and 100% of the way along the length of the pattern 24 respectively. The controller also in this case receives pattern configuration information specifying locations for mid-points of the colour gradient pattern of 15% and 85% along the pattern respectively.

Based on the received light output colours 22 and colour position information, the controller 20 first generates a pattern of colour points 24 comprised of three colour points associated with each of the three received colours and located at the positions specified by the received position information. Based on the received pattern configuration information, the controller then further interpolates further intermediary colours to fill the reminder of the pattern and which define a colour gradient pattern 48 in which the transition from colour C1 to colour C2 has a mid-point indicated at line 52, and the transition from colour C2 to C3 has a mid-point at line 53. The thus generated gradient pattern 48 is then mapped to pixels of the array in the manner described above.

The gradient mid-way points may be specified in particular examples by a user and output to the controller 20 in the form of said pattern configuration information by a suitable user interface device communicatively coupled with the controller. In further examples, the pattern configuration information may be determined by a further processing unit of the system on the basis of outputs of one or more sensors provided mounted along the LED lighting strip 14. For example, based on the outputs of one or more pressure or tension sensors, the further processing unit may determine locations of one or more bends, or may otherwise determine a particular shape or spatial configuration of the LED lighting strip. Based on this determined information, a suitable set of mid-way points 52, 53 of the gradient pattern 48 may be determined, for example to ensure that mid-way points correspond with mid or centre points of certain sections of the LED strip or with mid or centre points of certain objects or bodies about which the strip is wrapped.

In accordance with one or more sets of embodiments, the controller 20 may be operable in at least one control mode, to generate a looped colour gradient pattern. This may in particular be advantageous in cases where the system 10 comprises a lighting strip 14 which has been mounted or arranged in a loop shape, such that its two ends meet at a common point.

Figure 5:
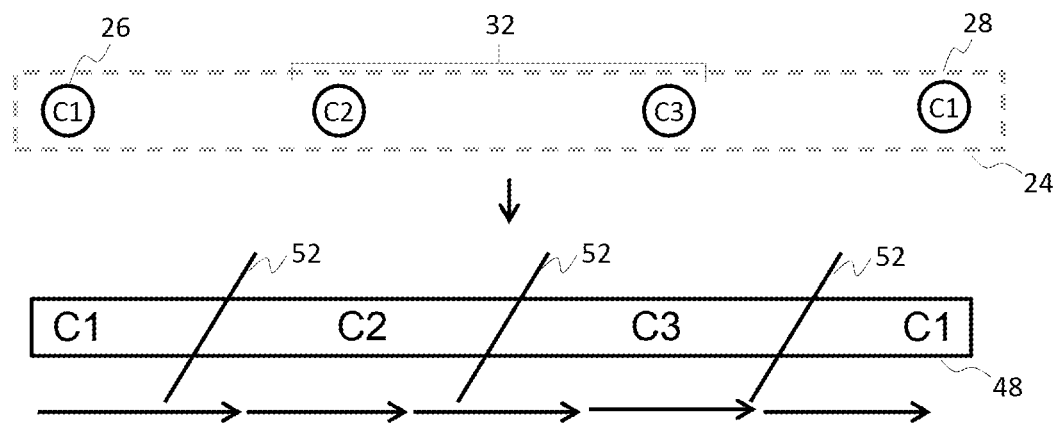
FIG. 5 schematically illustrates example control steps performed by a controller in generating a looped colour gradient pattern in accordance with one or more embodiments.

An example of this control mode is illustrated schematically in FIG. 5. For this example, it is assumed that the controller 20 receives three input colours (C1, C2, C3) and no colour position information. The controller may in addition receive pattern configuration information indicating that a looped gradient pattern is to be generated (either by means of a user interface or on the basis of outputs of one or more pressure/tension sensors mounted along the length of the strip).

In this case, the controller 20 may be configured to form an evenly spaced pattern 24 of colour points. In forming the pattern of colour points, the controller may be configured to assume that the first 26 and last 28 colours need to be the same such that the two ends of the lighting strip meet at the same colour and the gradient pattern appears continuous around the entire loop. Accordingly, the controller in this case forms a pattern 24 of four, evenly spaced colour points, positioned at 0%, 33%, 67% and 100% of the way along the pattern respectively. The first three colour points 26, 32 are assigned the colours of the three received light output colours, while the final colour point 28 is assigned the same colour as the first colour point.

Intermediate colour points are then interpolated to form a looping colour gradient pattern 48 having mid-way points 52 located half-way between each pair of points, as shown in FIG. 5.

In accordance with one or more sets of embodiments, the controller 20 may be operable in at least one control mode to generate a mirroring colour gradient pattern. An example is illustrated schematically in FIG. 6.

For this example, it is assumed that the controller 20 receives three light output colours (C1, C2, C3) and does not receive any colour position information. The controller may further receive pattern configuration information indicating that a mirrored gradient pattern is to be generated. The controller in accordance with this control mode is configured to form a pattern of colour points 24 comprising twice as many points as received colours, the points being evenly spaced along the length of the pattern.

The first half of the points are assigned each of the three received light output colours, and the second half of the points assigned a mirrored duplicate of these colours, with the first colour point 26 and the last colour point 28 being the same. In the present example, this results in the pattern of colour points 24 shown in FIG. 6.

Figure 6:
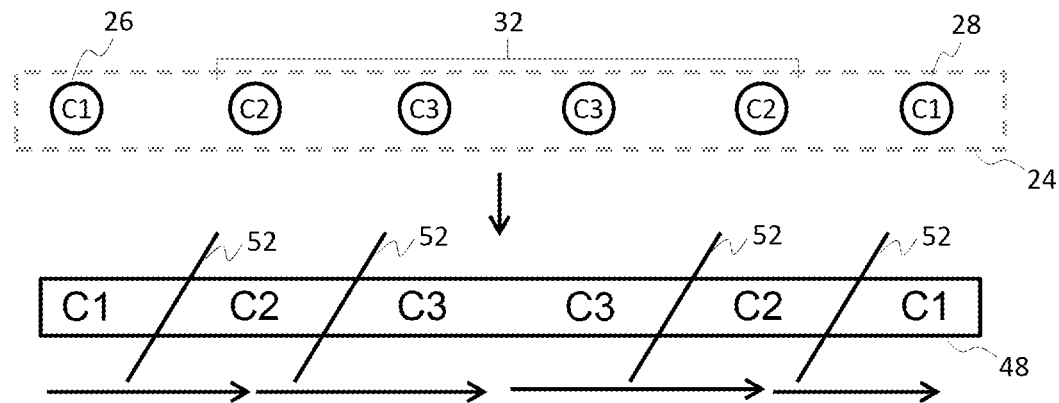
FIG. 6 schematically illustrates example control steps performed by a controller in generating a colour symmetrical colour gradient pattern in accordance with one or more embodiments.

Intermediate light output colours are then interpolated to fill the spaces of the pattern between each of the colour points and to thereby form a mirrored colour gradient pattern 48 as shown in FIG. 6.

As noted above, the controller 20 may be configured to receive pattern configuration information providing one or more constraints which constrain or define one or more properties of the pattern to be generated. In accordance with at least one set of examples, pattern configuration information may include a smoothness parameter, indicating a degree of smoothness of a colour transition provided by at least a portion of the interpolated light output colours of the colour gradient pattern 48.

Figure 7:
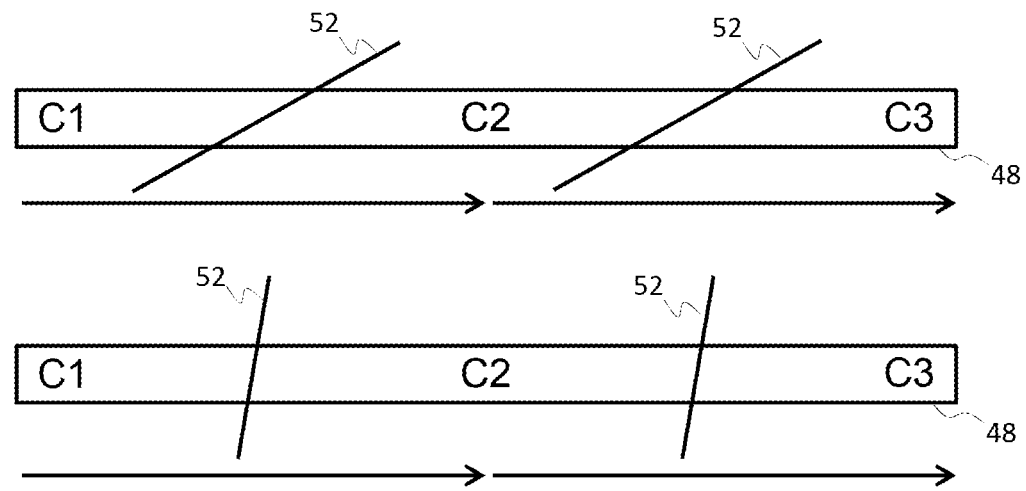
FIG. 7 schematically illustrates generation by a controller of colour gradient patterns having different smoothnesses of colour transition.

The smoothness parameter may indicate a high level of smoothness, in which case the controller 20 may be configured to interpolate the further light output colours 40, 42 so as to define a very finely gradated colour transition (as depicted schematically by the upper image of FIG. 7). Alternatively, the smoothness parameter may specify a low level of smoothness, in which case the controller may be configured to interpolate the further colour points so as to define a much more discretised or disjointed colour gradient pattern (as depicted schematically by the lower image of FIG. 7).

A high degree of smoothness may typically require a greater number of different intermediate light output colours 40, 42 to be interpolated by the controller 20 between each of the colour points 26, 28, 32 (i.e. to thereby define a higher resolution of colour gradient). The actual achievable degree of smoothness will in fact be limited to an extent by the maximum resolution (or pixel density) of the array of LED pixels 16. However, a certain freedom in gradient resolution or smoothness is achievable by varying the number of interpolated intermediary colours within a range of values not exceeding said maximum. As noted above, where fewer colours are interpolated than there are pixels in each row of the array, then each colour may be assigned to a plurality of (directly neighbouring) pixels.

In accordance with one or more sets of embodiments, the mirrored gradient pattern example described above may be extended so that in accordance with one or more control modes, the controller 20 may be operable to generate a broader set of different possible colour symmetric gradient patterns. In particular, the controller may be operable in one or more control modes to form, based on a set of two or more received light output colours, a colour symmetrical pattern of colour points with points equidistant in any direction from a defined one or more central colour points being of the same colour. From this, a colour gradient pattern being colour symmetrical about said central point(s) may then be created.

Figure 8:
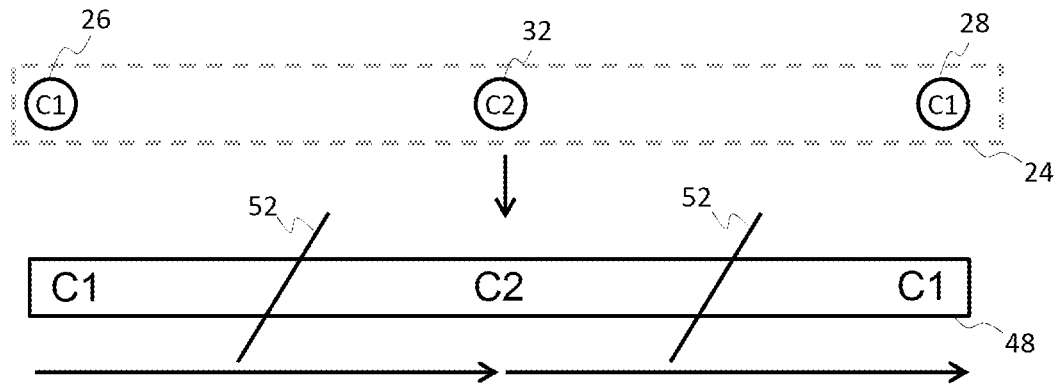
FIG. 8 schematically illustrates example control steps performed by a controller in generating a further colour symmetrical colour gradient pattern in accordance with one or more embodiments.

A simple first example is illustrated is FIG. 8. In this example, it is assumed that the controller 20 receives just two light output colours (C1 and C2). The controller may first order the colours by colour hue, saturation or perceived brightness, or alternatively may simply arrange the colours in an arbitrary order (for instance simply conforming with the order in which the colours are provided to the controller). The controller may further receive pattern configuration information indicating that a colour symmetrical pattern is to be generated. Alternatively, the controller may simply be configured or pre-programmed to process the received light output colours into a colour symmetrical pattern.

Once an order is determined (either arbitrarily or in accordance with received or pre-programmed instructions) the controller 20 is configured to form the colours into a pattern 24 of colour points. To form a symmetrical pattern of colour points, the controller may be configured to identify all but the final or lattermost one of the received colours, to duplicate these colour(s), reverse their order, and then append the colours to the originally received set of colours. A pattern of colour points may then be formed based on this extended set, resulting in a pattern of colour points which is colour symmetrical about a single central colour point.

In the present example in which two light output colours are received by the controller 20 (C1 and C2), the process of forming the colour symmetric pattern of colour points is simplified. With reference to FIG. 8, the controller simply duplicates the first of the colours (C1) and appends this colour to the end of the initial C1, C2 pair. The pattern of colour points 24 is then formed on the basis of this generated set of three colours. The controller may receive further colour position information, indicating specific locations for positioning one or more of the colour points 26, 28, 32. Alternatively, in the absence of further colour position information, the controller 20 may simply form an evenly spaced pattern of colour points (as shown in FIG. 8). As may be seen in FIG. 8, the thus formed pattern is 'colour symmetrical' about the central colour point 32.

Once the pattern of colour points 24 has been formed, a colour interpolation process is performed to calculate intermediate colour values between each of the three colour points. This full, interpolated set of colour points forms a colour symmetrical colour gradient pattern 48 across the pattern space. As in the previous embodiments, the colours of the colour gradient pattern may then be mapped to pixels 16 of the array of pixels. As in these previous examples, where the number of pixels along the length of the array is greater than the total number of colours, then each of the colours of the colour gradient pattern may need to be mapped to more than one pixel. Equally, where the total number of pixels is less than the total number of colours in the colour gradient pattern, certain colours may need to be discarded, or certain pairs combined so as to reduce the total number of colours.

Figure 9:
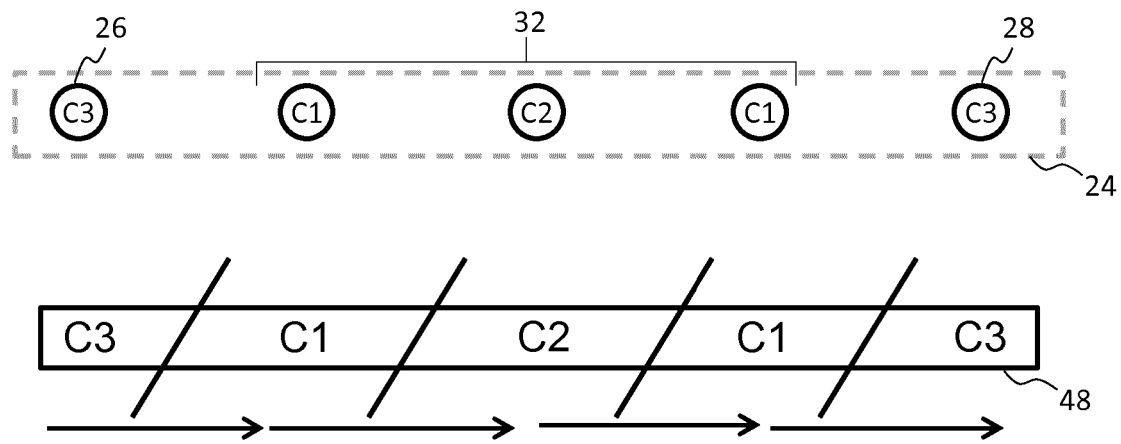
FIG. 9 schematically illustrates example control steps performed by a controller in generating a further colour symmetrical colour gradient pattern in accordance with one or more embodiments.

A further example is illustrated in FIG. 9 wherein the controller receives three light output colours, C1, C2, C3. For this example, the controller is configured to first sort the received colours by one of: colour hue; colour saturation; or (perceived) brightness. This may be as a result of receiving pattern configuration specifying an ordering procedure to be performed, or may be as a result of pre-programmed control instructions.

Ordering by colour hue may result in an aesthetically agreeable final gradient pattern, since the colours conform to certain natural colour progressions.

Sorting by perceived brightness may also result in an appealing appearance. For example, brighter colours may be positioned at the centre of the pattern and dimmer colours further toward the edges, so that when the pattern is displayed on the pixel array, more natural-looking effects are achieved. In particular, the array appears to emanate a source of brightness at the centre which tapers off with distance toward the edges.

For the present example, thus sorting and ordering of the colours is assumed to result in the following order of colours: C3, C1, C2.

Once the colours are ordered, the controller 20 is configured to process the colours in the manner described above in relation to FIG. 8, so as to form a colour symmetrical pattern of colour points symmetrical about a single central colour. In this case, a pattern 24 of five colours results, centred about a point assigned the colour C2 (the lattermost colour of the ordered colours as presented above).

Further light output colours are then interpolated, as above, to fill spaces of the pattern in-between the colour points 26, 28, 32, and thereby forming a colour gradient pattern 48 across the pattern space which is colour symmetrical about a centre point. Colours of the colour gradient are then mapped by the controller 20 to pixels 16 of the array, and the array controlled accordingly to thereby display the pattern.

It is noted that the above two embodiments (of FIG. 8 and FIG. 9), though similar, differ to the mirroring example of FIG. 6 in that the received set of light output colours are not simply reversed and then duplicated (thereby resulting in repeated colours at the centre of the pattern). Rather, the received colours are processed to form a pattern having a single central colour point (associated in these examples with colour C2). A more sophisticated processing procedure is therefore followed in these cases.

In accordance with one or more embodiments, the controller 20 may be configured to co-ordinate display of a colour symmetric colour gradient pattern across a set of more than one lighting device. In particular, the controller may be configured to provide co-ordinated control of two or more lighting strips 14, the array of pixels 16 in this case being understood as being distributed across all of the two or more strips.

Figure 10:
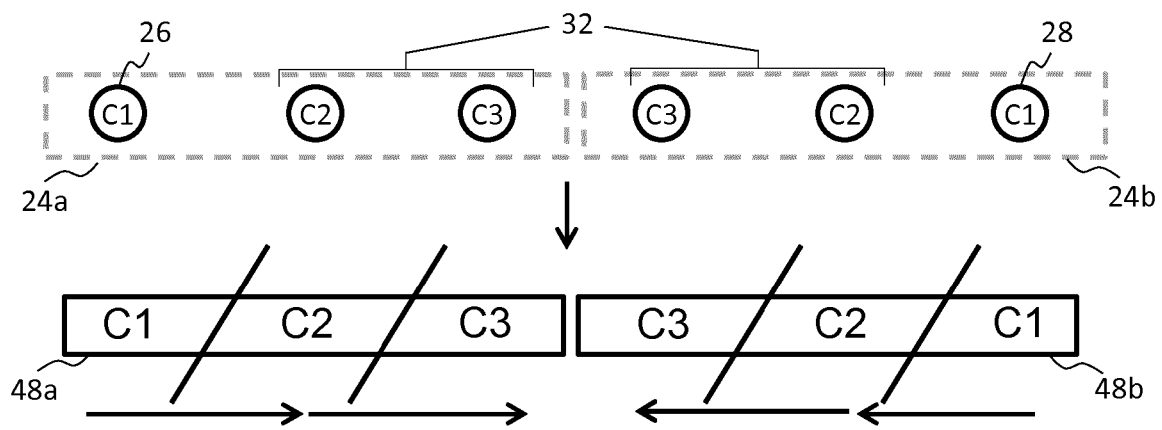
FIG. 10 schematically illustrates example control steps performed by a controller in displaying a generated colour gradient pattern across pixels of a plurality of lighting devices.

An example is schematically depicted in FIG. 10 wherein it is assumed that two pixelated LED lighting strips 14 are located proximal to one another and in a similar orientation (as shown). In this case, the controller 20 may control the strips together to provide a co-ordinated light display across the two.

This may be achieved substantially in accordance with the procedures outlined above in relation to FIG. 6, 8 or 9. In the particular example of FIG. 10, a procedure similar to that of the example of FIG. 6 is undertaken, wherein the received set of (in this case three) light output colours is duplicated and reversed and then appended to the original colours to form a mirrored set of light output colours. These colours are then formed into a pattern 24 of colour points based on this determined arrangement and further light output colours interpolated so as to form a colour gradient pattern 48.

For the present example, colours of the colour gradient pattern 48 are then mapped to pixels 16 of an array wherein the array is spread across two adjacent lighting devices. This is illustrated schematically in FIG. 10 by showing the pattern of colour points and colour gradient pattern divided notionally into two sections 24a and 24b and 48a and 4b respectively. However, this may in practice be only a notional division, since the controller 20 may simply unite pixels 16 of both of the strips and control the two as though they were a single integrated array of pixels. Upon mapping colours of the colour gradient pattern 48 to the pixels therefore, a division of the gradient pattern between the two strips naturally manifests, and being exactly in accord with the respective lengths of the two strips relative to one another.

Although above examples have focused primarily on forming one-dimensional patterns of colour points and colour gradient patterns for display on one-dimensional pixel arrays, any of the above described examples (and any of the examples to follow) may also be applied to the generation of two-dimensional or even three-dimensional colour gradient patterns for display on suitable 2-D or 3-D pixel arrays. In the simplest cases, a two-dimensional colour gradient pattern may simply be formed by stretching a one-dimensional pattern upwards or downwards into a second dimension, fully duplicating the original one-dimensional pattern along each additional row of pixels. In this case, there would be no colour variation along the direction of the second dimension; the colour gradient would be exhibited only along the first dimension. This will provide a simple and easy way to expand a colour gradient pattern to fill a two-dimensional pixel array.

In more complex examples, colour gradient patterns may be formed which vary in colour across two or more dimensions. In these cases, forming the pattern of colour points may comprise forming a two-dimensional or three-dimensional pattern of colour points, with points assigned to locations anywhere within a two-dimensional or three-dimensional pattern space.

In accordance with any of the above described embodiments, more complex control operations may be implemented in forming the pattern of colour points 24 and the colour gradient pattern 48. In one or more sets of examples, a position of an observer and/or the direction of an observer's gaze may be tracked by means of a suitable position or eye tracking device and this information used in forming the pattern of colour points. In particular, a centre point of a colour symmetrical pattern of colour points may be configured in accordance with a known position of an observer or known direction of an observer's gaze. This effect may even be implemented dynamically, such that for instance the centre point of a symmetrical lighting effect may be controlled to move in correspondence with movement of an observer or movement of an observer's gaze.

To facilitate such examples, the system 10 may further comprise a position or movement sensor or tracking device or may be configured to receive outputs from such a device. The device may simply comprise a camera or may comprise a more sophisticated, dedicated movement tracking device. In further examples, a microphone array may be provided for monitoring or sensing position or movement of a user.

The system may further comprise an eye tracking device or be configured to receive outputs from such a device. In further examples, information relating to an observer's position may be obtained from a personal mobile computing device or wearable device located on the person of an observer and being suitably communicatively linked with the system by means of a suitable data network link for example.

In accordance with a further set of embodiments, the controller 20 may be operable to provide dynamic colour gradient effects across the array of LED pixels 16. It is known that, for example, smooth, gradually changing or moving linear light patterns are generally aesthetically appealing to observers since they can resemble natural phenomena (e.g. light patterns created by moving clouds or the linear symmetrical effects created by a sunrise).

Remotely feeding a connected LED array with a stream of dynamic lighting content so as to enable such effects places high demands on the lighting system network. Often there may be insufficient bandwidth to facilitate such direct live control, or implementing such control can place strain on the network's capacity. Embodiments of the present invention therefore, which are adapted to create light effects based on receipt of only a limited set of input information, may be utilised to provide dynamic control effects without the need for high capacity data streaming.

All embodiments are based on transitioning outputs of a pixel array smoothly through a series of different particular colour gradient patterns. Two main approaches are envisaged for facilitating such dynamic control. In a first set of embodiments, the colour transitions for each pixel at each interval of time are determined locally. In accordance with a second set of embodiments, the colour transitions for a subset of the pixels at each interval of time are determined remotely and communicated to the controller via a suitable network link. Examples in accordance with each approach will now be described in detail.

In accordance with the first control approach (to be referred to as "local lamp dynamics"), content generation for the dynamic gradient pattern is performed predominantly locally by the controller 20 of the lighting device.

In particular, in accordance with at least one subset of examples, the controller 20 is configured to form a pattern 24 of colour points based on a received set of light output colours (as described in examples above), and then generate a full colour gradient pattern 48 based on the pattern of colour points. To create dynamic effects, the controller is configured to repeatedly select different limited sections or regions of the full gradient pattern to map and display across the array of the LED pixels. This generates a dynamic or moving gradient pattern effect.

Figure 11:
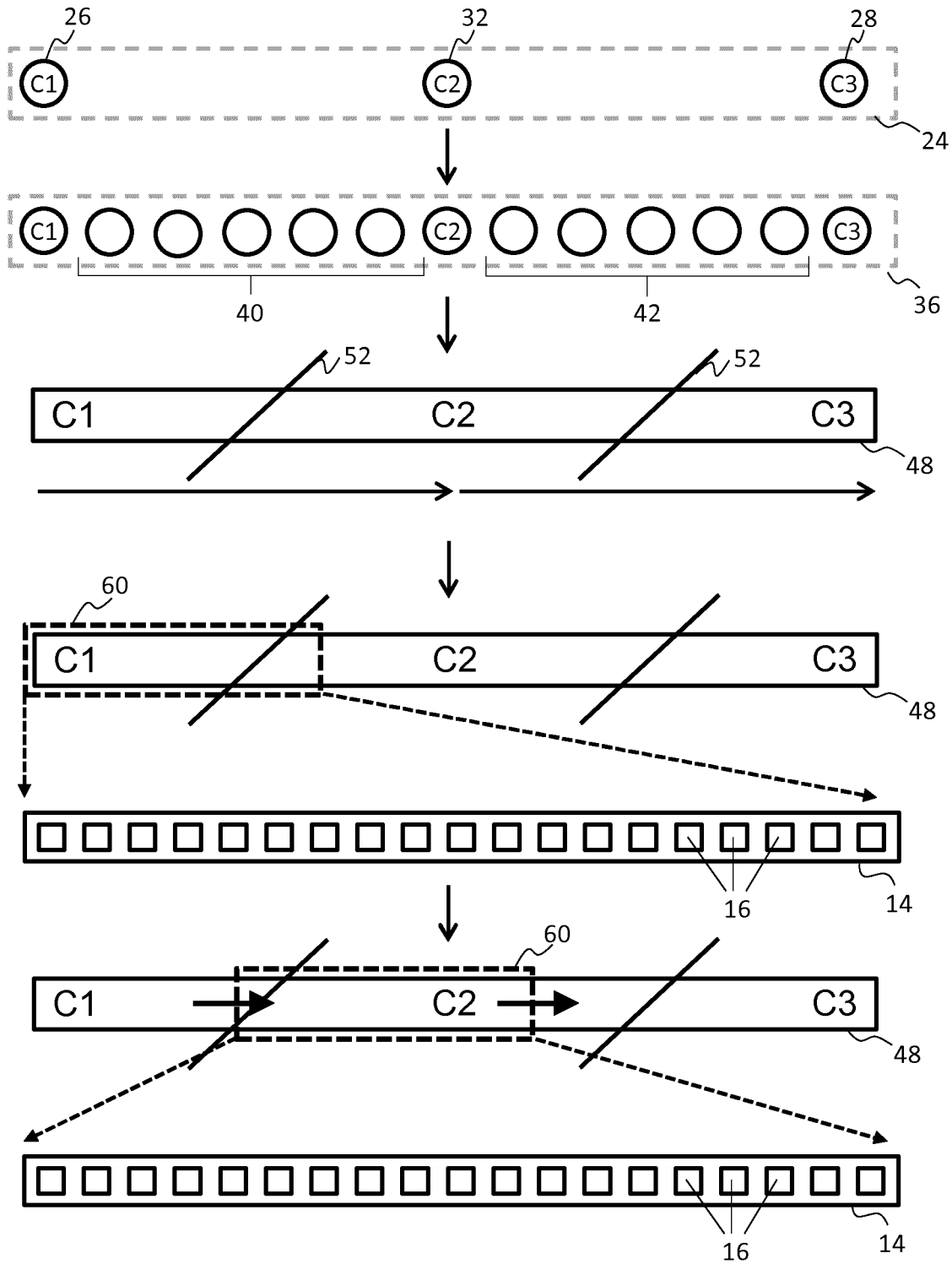
FIG. 11 schematically illustrates example control steps performed by a controller in generating a dynamic colour gradient pattern in accordance with one or more embodiments.

Control steps for a first example are illustrated schematically by FIG. 11. In this particular example, the controller 20 is configured to first generate a full colour gradient pattern 48 and then to select and map sequentially consecutive portions 60 of the colour gradient pattern to the array of pixels 16, to thereby generate a moving gradient pattern lighting effect. The figure schematically depicts control steps performed by the controller 20 in generating this locally rendered dynamic gradient effect.

For this example, it is assumed that three light output colours C1, C2, C3 are initially received by the controller 20 and these formed into a pattern 24 of colour points 26, 28, 32 in accordance with methods described above. Forming the pattern of colour points may in particular be performed in accordance with any of the examples or embodiments outlined above. The controller 20 may in particular examples be configured to further receive colour position information and/or pattern configuration information for informing arrangement of the received light output colours within the pattern 24.

As in previous embodiments, upon forming the pattern of colour points 24, the controller is configured to subsequently interpolate set(s) of further intermediary output colours 40, 42 to fill spaces of the pattern in between each of the colour points 26, 28, 32. The further output colours 40, 42, are selected so as to create a full gradated pattern 36 of colour points which together define a colour gradient pattern 48 extending across the length of the pattern space. The colour gradient pattern 48 thus generated is illustrated in FIG. 11 wherein midpoints for the colour gradient pattern are illustrated by inclined lines 52, in this case assumed to be located halfway between each neighbouring pair of primary colour points C1, C2, C3.

Once the gradient pattern 48 is generated, the controller 20 selects a first limited linear section 60 of the gradient pattern for mapping to pixels 16 of a pixel array. In the present example in particular, the array of pixels 16 is assumed to be comprised by an LED lighting strip 14. Mapping of colours of this first limited linear section 60 of the colour gradient pattern to pixels 16 of the array may be performed as described in any of the examples outlined above.

In some cases, the total number of colours comprised by the linear section 60 may be less than the total number of pixels 16 in the array. In this case, one or more of the colours may be assigned or mapped to a plurality of the pixels 16. Once the mapping has been performed, the controller 20 is configured to control colour outputs of the pixels accordingly, so as to display the section of the pattern 60 across the length of the array.

To create the dynamic gradient effect, the controller 20 is configured to recurrently re-select new linear sections 60 of the gradient pattern 48 to map to the array of pixels 16. In particular, in the present example, the controller is configured to recurrently select and map sequentially consecutive portions of the colour gradient pattern. The controller effectively executes a 'sweep' across the full colour gradient pattern, recurrently mapping the light output colours of a moving section 60 of the colour gradient pattern to pixels 16 of the array.

This process is schematically illustrated in FIG. 11, in which is depicted selection by the controller of a linearly consecutive section 60 of the colour gradient pattern 48 at a further moment in time and mapping of this section to the array of pixels 16. The arrows schematically indicate the (notional) motion of the linear section in time, wherein at each of a series of regular time intervals, the selected section 60 is shifted linearly and is newly mapped to the pixels 16 of the array.

This sweeping mapping action creates an effect on the pixel array of a moving gradient pattern, with the displayed pattern appearing to progress linearly along the length of the array. The sweep across the gradient pattern 48 may be reversed upon reaching an end-point of the pattern, thereby creating a 'bounce' effect in the pattern displayed on the array of LED pixels 16. This is accomplished by simply reversing the 'movement direction' of the mapped section 60. This has the advantage of avoiding any discontinuities in the displayed gradient pattern (as may be created in the case for example that the moving section 60 were to simply return back to the beginning of the colour gradient pattern 48 upon reaching the end).

In accordance with one or more particular examples, further control steps may be implemented in order to ensure that a perceived 'movement' of the colour gradient pattern is in alignment with an orientation of the array of pixels 16. To facilitate this, the controller 20 may be configured to receive inputs from one or more sensors adapted to sense an orientation of the array. These may for example be orientation sensors or cameras provided mounted to or proximal to an LED lighting strip 14 comprising the array. These sensors may be included as part of the lighting device 10 or may simply be communicatively coupled with the controller of the system. Alternatively, orientation information may be input by a user, e.g. during set-up or configuration of the system, by means for instance of an associated control app installed on a user's mobile computing device, or by means of a dedicated user interface device.

Each new mapping may be performed instantaneously at the moment of each passing time interval. Alternatively, the mapping of each of the different linearly shifted sections 60 may be performed in advance, and stored for example in a local memory comprised by the lighting device 10. Each of the stored mappings may then simply be recalled at an appropriate time interval.

In accordance with one or more further embodiments, the controller 20 may be configured to pre-process each selected portion 60 of the colour gradient pattern 48 in advance of mapping. The pre-processing may in particular comprise mirroring the pattern portion 60 about an end-point to thereby generate a centrally symmetric colour gradient pattern portion for mapping to the array. This is illustrated schematically in FIG. 12.

As in the example of FIG. 11, a set of light output colours C1, C2, C3 are first received, formed into a pattern of colour points 24, and further intermediate colours interpolated so as to define a colour gradient pattern 48. Also as previously described, the controller 20 is configured to subsequently select a limited linear section 60 of the pattern. However, further to the previous example of FIG. 11, this limited section 60 is then pre-processed in advance of mapping to the array of pixels 16. In particular the section is mirrored about a reflection axis 64 oriented perpendicularly to a length of the gradient pattern and aligned parallel with a right-most edge of the linear section 60. Each colour of the limited section is duplicated, in reverse order, and appended to the end of the linear section 60 to thereby form a 'mirrored' gradient pattern section 61 for mapping to the array of pixels.

Colours of the mirrored pattern section 61 are then mapped to pixels 16 of the array, and the pixels then controlled in accordance with the mappings so as to display the mirrored section 61 across the array.

As in the previous example of FIG. 11, the controller 20 is configured to recurrently 'move' or shift the selected linear section 60 along the length of the colour gradient pattern 48 as a function of time. Each time the selected section is shifted (after a given time interval), a new 'mirrored' gradient pattern section 61 is generated and mapped to pixels 16 of the array.

In this way, a dynamic pattern is created across the pixel array in which the colours of the pattern appear to be moving outwards from the centre towards the ends of the pixelated LED array.

Figure 12:
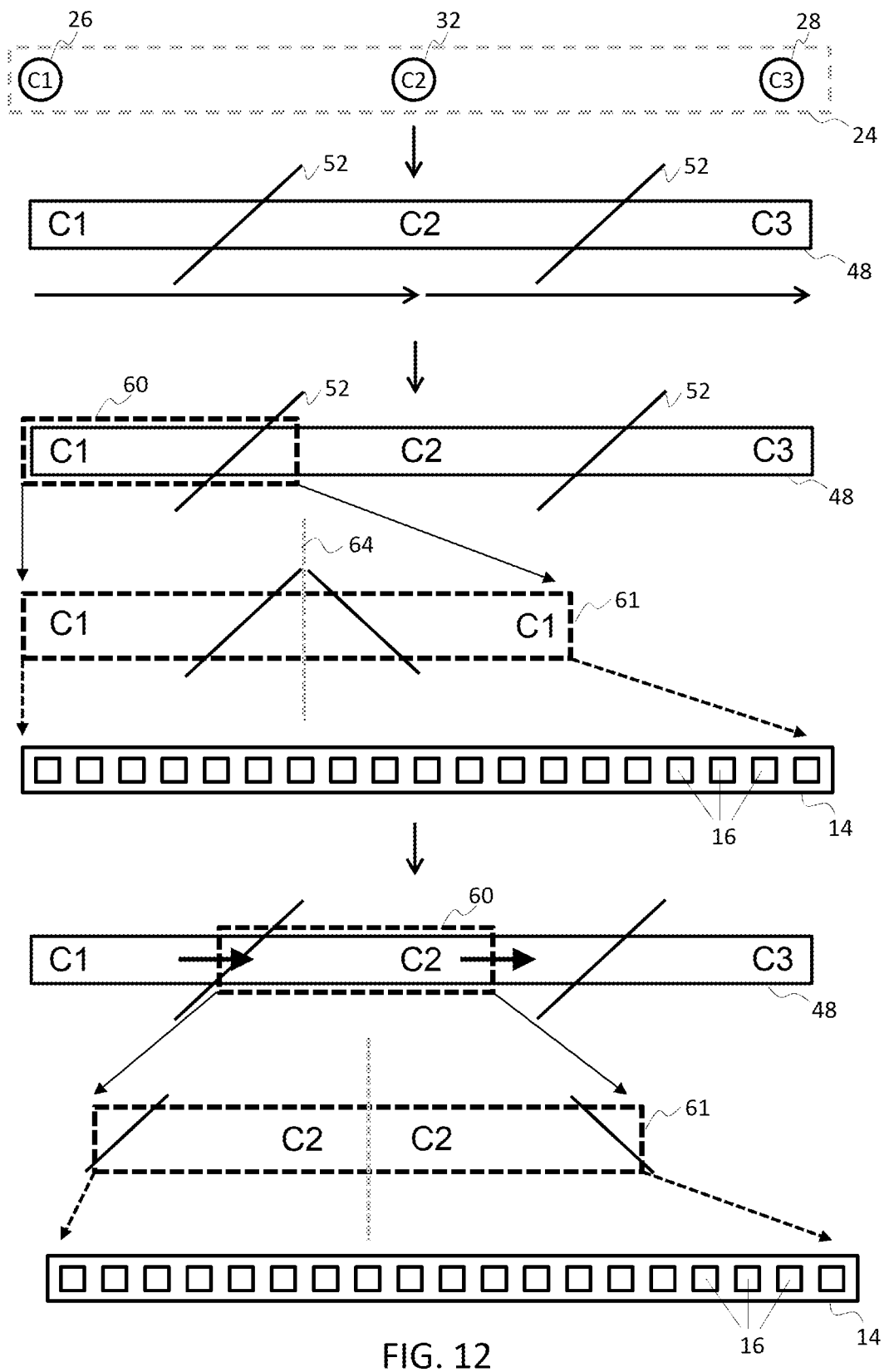
FIG. 12 schematically illustrates example control steps performed by a controller in generating a further dynamic colour gradient pattern in accordance with one or more embodiments.

In the particular example illustrated in FIG. 12, the symmetrical or mirrored pattern section 61 is created using a reflection axis 64 aligned at a far end of the initially selected pattern section 60. However, in further examples, this axis may be shifted (leftwards for instance) so as to create different colour effects, for instance in which the symmetry of the mirrored pattern is skewed slightly off-centre.

Additionally or alternatively, the mirrored gradient effect may be created across only a limited portion or section of the array of pixels 16. For instance, as described above, the particular physical configuration or arrangement of an LED lighting strip 14 (or multiplicity of strips) comprising the array may be such as to incorporate certain natural bends and linear or curved segments.

For instance a lighting strip may be wrapped around an item of furniture, such that one section extends along a front surface of the item, and further sections extend along side surfaces. The controller may control the strip 14 so as to display the mirrored gradient pattern effect across only one of these sections.

For example, a user may wish to create mirrored gradient effects so as to simulate a sunrise lighting effect in the morning and a sunset lighting effect in the evening. In this case, the user may transmit pattern configuration information to the controller 20 by means for instance of a connected mobile computing device indicating a desired position for the sun to rise at sunrise time (e.g. the east of the room) and a position for the sun to set at sunset time (e.g. the opposite side of the room). The controller may then be configured to determine an appropriate section or portion of the array of pixels 16 to which the generated mirrored gradient patterns should be mapped and displayed.

In accordance with one or more examples, the lighting strip 14 may comprise one or more touch sensors (e.g. capacitive touch sensors) installed along its length and by means of which a user may indicate a particular location along the array for displaying a desired lighting effect.

Any of these examples in accordance with the embodiment of FIG. 12 may advantageously be combined with the further 'bounce' control effect described above in relation to the example of FIG. 11 so as to obviate any discontinuities in the dynamic gradient pattern.

In accordance with any of these examples, the controller 20 may be configured to receive dynamic control information, wherein the selection and subsequent mapping of the different linear portions 60 is at least partly based on said dynamic control information. The dynamic control information may include user input commands specifying for instance a particular dynamic control mode to execute. The controller may contain a number of pre-stored dynamic mapping programs, and wherein the dynamic control information may be used to inform which of the programs to execute in controlling the array of LED pixels 16.

In accordance with any of the above dynamic control examples, the formation of the initial pattern of colour points 24 may be performed in accordance with any of the methods or approaches described in previous (non-dynamic) examples. In particular, the controller 20 may in accordance with one or more sets of examples be operable in certain control modes to form the light output colours into a colour symmetrical pattern of colour points, or into a 'looped' or cyclical pattern of colour points for instance. A corresponding colour gradient pattern 48 may then be generated, and wherein the dynamic control consists simply in executing a 'sweep' across the thus formed pattern as described above.

The above examples of FIGS. 11 and 12 relate to the first control approach ("local lamp dynamics"). Examples will now be described in relation to the second control approach (which will be termed "remote lamp dynamics"). In these examples, the dynamic transition behaviour of the gradient pattern is at least in part directed or controlled through remotely transmitted and received control instructions.

In particular, the controller 20 may be configured to receive an initial set of light output colours and/or colour position information, along with control instructions relating to a set of one or more colour transitions to be performed for each colour point of the pattern of colour points at each of a set of one or more future time intervals. At each new time interval, the controller consults the received control instructions to determine how the pattern of colour points should be altered. The colours of each of the colour points are changed in accordance with the instructions, and, based on the updated pattern of colour points, a new colour gradient pattern interpolated and mapped to the array of LED pixels. New control instructions may be recurrently received at a series of further time intervals, either at regular intervals or sporadically.

Hence, rather than determining colour transitions locally in accordance with a pre-defined transition algorithm or program (such as the 'sweep' mode described above), specific colour transitions for each colour point of the pattern 24 is communicated to the controller (for instance from a remote server) and this information used in determining colour transitions of the colour gradient pattern at each passing interval of time.

Figure 13:
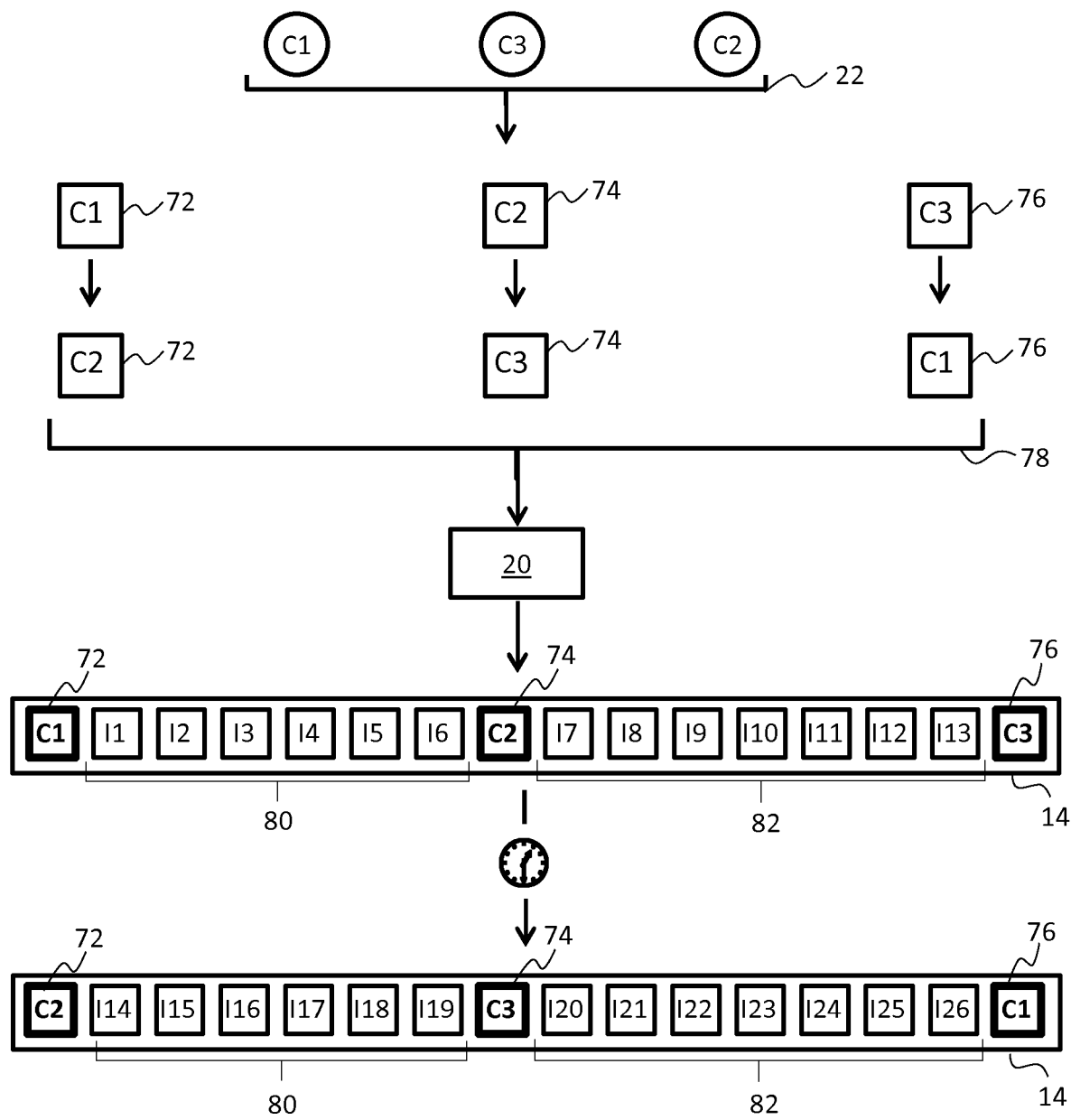
FIG. 13 schematically illustrates example control steps performed by a controller in generating a further dynamic colour gradient pattern in accordance with one or more embodiments.

An example is illustrated in FIG. 13. For this example, three light output colours 22 (C1, C2, C3) are assumed to be input at a remote server (either user input or an alternative data input source, such as one or more sensors), wherein said remote server is communicatively coupled with the controller 20.

The remote server sorts the received colours into a particular order to thereby arrive at the ordered set of colour points 72, 74, 76 shown in FIG. 13. In addition to ordering the colours, the server further determines a set of transitions 78 for the colour points, representing an intended change in colour for each of the colour points to occur after a given time interval. This time interval may also be determined by the remote server, or may be determined locally by the controller 20 of the lighting device. These transitions may be determined based upon further data inputs to the server, or based upon a pre-determined program or algorithm for example.

A set of example transitions 78 are illustrated in FIG. 13. In particular, for this example, it is assumed that the server determines that colour point 72 should transition from colour C1 to C2, colour point 74 should transition from colour C2 to C3 and colour point 76 should transition from colour C3 to C1.

Once the set of ordered colour points 72, 74, 76 and their associated transitions 78 have been determined, these are communicated to the controller 20 of the lighting device 10. Upon receipt of the colour points and transition information, the controller 20 is configured to locally interpolate sets of intermediary colour points 80, 82 so as to define a colour gradient pattern extending across the length of the pattern space. The controller 20 then maps this completed set of colours to pixels of the array of pixels 16. For the present example, it is assumed that the pixel array is comprised by an LED lighting strip 14.

As illustrated in FIG. 13, after a defined time interval, the controller 20 is configured to consult the set of colour transition information 78 received from the remote server and to alter the pattern of colour points output to the pixel array accordingly. In particular, the controller is configured to switch each of the primary reference colour points 72, 74, 76 according to the transitions defined by the received transition information, and then to interpolate a new set of intermediary colour points 80, 82 to provide a new colour gradient pattern extending along the length of the pattern space. The colours of this new pattern are then output to pixels 16 of the array as before.

At each transition step therefore, the controller 20 is configured to consult received transition information to determine how to alter the primary reference colours 72, 74, 76, and then to interpolate new intermediary colours 80, 82 to form a complete colour gradient pattern.

Figure 14:
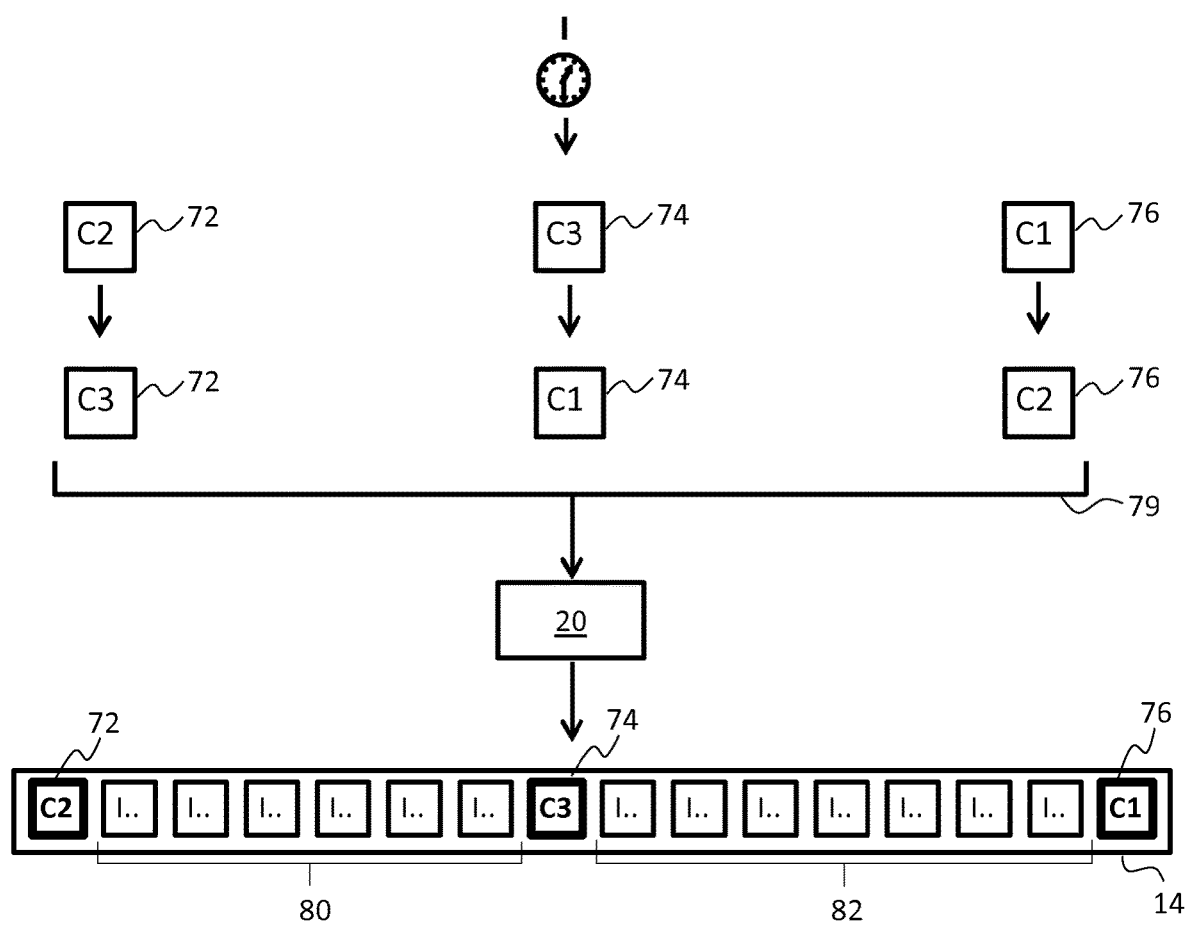
FIG. 14 schematically illustrates further example control steps performed by a controller in generating the dynamic colour gradient pattern of FIG. 13.

In order for the dynamic transition effect continue over time, preferably the remote server continues to determine new sets of colour transitions for each new interval in time, and recurrently communicate these to the controller at each new time interval. This is illustrated in FIG. 14 which schematically illustrates determination by the remote server after the given time interval of a new set of colour transitions 79 to follow the first set 78 defined in FIG. 13. In particular, it is determined that colour point 72 should transition from colour C2 to C3, colour point 74 should transition from colour C3 to C1 and colour point 76 should transition from colour C1 to C2.

As previously, these transitions are subsequently communicated to the controller 20 of the lighting device. The controller is configured to utilise this new set of transitions in forming a new set of colour points to map to pixels of the array. Primary colour points 72, 74, 76 are transitioned from their previous assigned colours to the new colours indicated by the received transition information. A new set of intermediary colour points 80, 82 is interpolated to complete the remainder of the colour gradient pattern. Colours of the completed pattern are then mapped to pixels of the array (in this case comprised by the LED lighting strip 14).

In more particular examples, the controller may be configured to receive colour transition information pertaining to specific pixels within a pixel array. In particular, there may be associated with the pixel array a number of reference or 'control' pixels, these being pixels which, for instance by prior designation, are pixels whose colour transitions are to be determined by a remote server. The total number of control pixels for a given array within a given lighting device may be determined in advance and may be known or communicated to the remote server. Based on this information, the remote server may determine a corresponding number of colour points for assigning to these control pixels and associated colour transitions for the pixels. For example, for the example illustrated in FIGS. 13 and 14, the remote server may identify that the LED lighting strip 14 has three control pixels (highlighted in bold) and may therefore determine a set of three colour points and associated colour transitions, one for assigning to each of the three control pixels.

Upon receipt of these control pixel colours and transitions, the controller 20 may then interpolate a set of intermediate colours 80, 82 for assigning to pixels in-between the control pixels.

It is noted that the bounce effect described in relation to the local lamp dynamic examples may equally be applied in accordance with any of the above described examples of "remote lamp dynamics". To enable bounce mode gradient transitions, it is necessary simply that each of the primary colour points (or control pixels) 72, 74, 76 be transitioned recurrently forwards and then backwards through a given ordered set of colours.

Additionally, other dynamic modes such as centre-outwards or centre inwards effects (mirrored dynamic gradient effect) may also be achieved in accordance with the remote lamp dynamic approach, simply through selection and communication of an appropriate set of colour transitions to the controller.

It is emphasised that for the 'remote lamp' dynamic control approach, the remote server may typically not be a part of the lighting device of the present invention. The controller may simply be provided with a suitable communicative coupling with a remote server, or with means for establishing such a coupling. This coupling may comprise for example a suitable data network link, for instance a local area network connection or an internet connection.

In accordance with any of the 'remote lamp' dynamics approaches described above, the controller 20 may receive from a remote server only a subset of a total number of colour points and associated transitions for forming the pattern of colour points or for assigning to control pixels of the array. With reference to FIG. 12 for example, the controller may receive only two colour points from the remote server (for instance 72, 74). The controller may in this case be configured to determine further colour points in order to form a pattern of colour points and subsequently a colour gradient pattern. The controller may follow for instance a pre-stored set of program instructions for determining such further colours. The controller may be configured to interpolate a further one or more colours.

In accordance with at least one example control mode, the controller may be configured to form from a received set of two colour points a symmetrical pattern of colour points. This would require only duplicating the first of the received colours and appending this to the end of the received set.

In accordance with an alternative example control mode, the controller may be configured to extend a received set of two colour points into three or more colour points by interpolation. For instance, received yellow and red colour points could be extended by addition of an orange colour point situated between the two. The colour palette may be extended in other ways also, such as for instance identifying colours 'close to' (in terms of hue for instance) one or more of the received colours or simply selecting one or more random colours within a certain defined or determined range or spectrum of colours.

In accordance with a further set of one or more dynamic control embodiments, the controller may be configured to generate a dynamic gradient pattern based upon a set of user inputs. In particular, the controller may be configured to receive one or more user-defined colour assignments for one or more specific pixels along the pixel array.

For example, a user or content designer may manually select one or more input colours and identify a particular set of one or more pixels to which these colours are to be assigned. The user may furthermore specify a particular dynamic control mode in accordance with which the controller 20 is to generate a particular dynamic lighting effect.

For example, a user may wish to mimic a sunrise effect. In this case, he or she may select an initial set of two light output colours: blue and yellow—representing the blue sky and yellow sun. They might assign the blue colour to the two outermost pixels of the array and the yellow colour to a centrally located pixel within the array. They may furthermore provide control instructions indicating that the controller is to generate a dynamic gradient effect in which colours appear to move from the centre outwards, thereby mimicking the appearance of a sunrise. As discussed above, such an effect can be realised through implementation for example of the mirrored mapping dynamic mode illustrated with reference to FIG. 12. A user may also specify the particular duration over which the dynamic effect is to extend (e.g. 30 minutes) and may furthermore indicate how many times the particular sequence is to be executed (e.g. for this example, only once). In this way, a sunrise effect extending over 30 minutes can be replicated on the pixelated light strip 14 based upon only a limited set of input control information.

Embodiments above have been described predominantly in relation to an array of pixels 16 which is comprised by a pixelated LED lighting strip 14. However, in accordance with any embodiment of the invention, the array of pixels may be comprised by any variety of lighting device. This may include for instance simply a dedicated pixelated display, for instance comprising a planar array of pixels. The array may be provided as part of an LCD display in further examples. In examples, the array may be directly incorporated within an object or item of furniture. The array may be incorporated within a wall, ceiling, floor, or stairs of a room or shape. Any other device or structure for mounting or supporting an array of pixels may also be considered in any embodiment of the invention.

As discussed above, embodiments make use of a controller 20. The controller can be implemented in numerous ways, with software and/or hardware, to perform the various functions required. A processor is one example of a controller which employs one or more microprocessors that may be programmed using software (e.g., microcode) to perform the required functions. A controller may however be implemented with or without employing a processor, and also may be implemented as a combination of dedicated hardware to perform some functions and a processor (e.g., one or more programmed microprocessors and associated circuitry) to perform other functions.

Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media such as volatile and non-volatile computer memory such as RAM, PROM, EPROM, and EEPROM. The storage media may be encoded with one or more programs that, when executed on one or more processors and/or controllers, perform the required functions. Various storage media may be fixed within a processor or controller or may be transportable, such that the one or more programs stored thereon can be loaded into a processor or controller.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A lighting device for providing a colour gradient light effect, comprising:
   an array of light emitting pixels, each pixel having a controllable light output colour and an associated location within the array; and
   a controller configured to:
      receive two or more light output colours;
      form from the light output colours a pattern of colour points comprising two end points and at least one intermediate point;
      generate a colour gradient pattern based on the pattern of colour points by interpolating further light output colours to populate regions of the gradient pattern in-between the colour points; and
      map output colours of at least a portion of the colour gradient pattern to pixels within the array, and control said pixels in accordance with the mapped output colours to thereby generate the colour gradient light effect across the array;
   wherein the controller is further configured to receive pattern configuration information comprising one or more constraints, and wherein the pattern of colour points and/or the colour gradient pattern is generated based on said constraints, and
wherein the controller is configured to control the array of light emitting pixels to provide a dynamic colour gradient light effect by recurrently:
   receiving updated colour position information and/or light output colours;
   altering the pattern of colour points accordingly;
   regenerating the colour gradient pattern based on the altered pattern of colour points; and
   mapping output colours of the regenerated colour gradient pattern to the array of light emitting pixels.

2. The lighting device as claimed in claim 1, wherein the system comprises an elongate lighting strip, the array of light emitting pixels being distributed along a longitudinal length of the lighting strip; and/or the system comprises a plurality of elongate lighting strips, the array of light emitting pixels being distributed across the plurality of lighting strips.

3. A lighting device as claimed in claim 1, wherein said pattern configuration information includes colour position information defining pattern locations for one or more of the received light output colours, and wherein the controller is configured to form said pattern of colour points on the basis of said colour position information.

4. The lighting device as claimed in claim 3, wherein said colour position information is received from:
   a user interface being communicably coupled with the controller; and/or
   one or more sensors being communicably coupled with the controller.

5. The lighting device as claimed in claim 1, wherein said one or more constraints include locations of one or more mid-points of the colour gradient pattern, mid-points representing mid-points in a colour transition from a first light output colour to a second light output colour.

6. The lighting device as claimed in claim 1, wherein said one or more constraints comprise a smoothness parameter, defining a smoothness of a colour transition provided by at least a portion of the further light output colours.

7. The lighting device as claimed in claim 1, wherein forming the pattern of colour points comprises sorting the received light output colours in accordance with at least one of: colour hue, saturation and perceived brightness, and assigning pattern location points to each of the output colours on the basis of said sorting.

8. The lighting device as claimed in claim 1, wherein the controller is configured to form a pattern of colour points which comprises a recurring sequence of colour points.

9. The lighting device as claimed in claim 1, wherein the pattern of colour points is formed so as to comprise a colour symmetrical pattern of colour points, with points equidistant in any direction from a defined one or more central colour points being of the same colour.

10. The lighting device as claimed in claim 9, wherein the controller is configured to receive dynamic control information, and wherein the selection and subsequent mapping of the different linear portions is at least partly based on said dynamic control information.

11. The lighting device as claimed in claim 10, wherein the controller is configured to select and map sequentially consecutive portions of the colour gradient pattern to the array of pixels, to thereby generate a moving colour gradient light effect, and optionally wherein the controller is configured to reverse a direction in which the consecutive portions are sequentially selected upon reaching an end point of the colour gradient pattern.

12. The lighting device as claimed in claim 10, wherein the controller is configured to pre-process each selected portion of the colour gradient pattern in advance of mapping, the pre-processing comprising mirroring the pattern portion about an end-point to thereby generate a centrally symmetric colour gradient pattern portion for mapping to the array.

13. A method of controlling an array of light emitting pixels of a lighting device to generate a colour gradient light effect, each pixel of the array having a controllable light output colour and an associated location within the array, and the method comprising, at the lighting device:
   receiving two or more light output colours;
   forming a pattern of colour points from the received light output colours;
   generating a colour gradient pattern based on the pattern of colour points by interpolating further light output colours to populate regions of the gradient pattern in-between the colour points; and
   mapping output colours of at least a portion of the colour gradient pattern to pixels within the array, and controlling said pixels in accordance with the mapped output colours to thereby generate the colour gradient light effect across the array, wherein the method further includes receiving pattern configuration information comprising one or more constraints, and wherein the pattern of colour points and/or the colour gradient pattern is generated based on said constraints, and wherein the method further comprises controlling the array of light emitting pixels to provide a dynamic colour gradient light effect by recurrently:
- receiving updated colour position information and/or light output colours;
- altering the pattern of colour points accordingly;
- regenerating the colour gradient pattern based on the altered pattern of colour points; and
- mapping output colours of the regenerated colour gradient pattern to the array of light emitting pixels.

14. A lighting device for providing a colour gradient light effect, comprising:
- an array of light emitting pixels, each pixel having a controllable light output colour and an associated location within the array; and
- a controller configured to:
  - receive two or more light output colours;
  - form from the light output colours a pattern of colour points comprising two end points and at least one intermediate point;
  - generate a colour gradient pattern based on the pattern of colour points by interpolating further light output colours to populate regions of the gradient pattern in-between the colour points; and
  - map output colours of at least a portion of the colour gradient pattern to pixels within the array, and control said pixels in accordance with the mapped output colours to thereby generate the colour gradient light effect across the array;
- wherein the controller is further configured to receive pattern configuration information comprising one or more constraints, and wherein the pattern of colour points and/or the colour gradient pattern is generated based on said constraints, and wherein the controller is configured to control the array of light emitting pixels to provide a dynamic colour gradient light effect by recurrently selecting and mapping different linear portions of the colour gradient pattern to the array at regular time intervals.

15. A method of controlling an array of light emitting pixels of a lighting device to generate a colour gradient light effect, each pixel of the array having a controllable light output colour and an associated location within the array, and the method comprising, at the lighting device:
- receiving two or more light output colours;
- forming a pattern of colour points from the received light output colours;
- generating a colour gradient pattern based on the pattern of colour points by interpolating further light output colours to populate regions of the gradient pattern in-between the colour points; and
- mapping output colours of at least a portion of the colour gradient pattern to pixels within the array, and controlling said pixels in accordance with the mapped output colours to thereby generate the colour gradient light effect across the array, wherein
- the method further includes receiving pattern configuration information comprising one or more constraints, and wherein the pattern of colour points and/or the colour gradient pattern is generated based on said constraints, and wherein the method further comprises controlling the array of light emitting pixels to provide a dynamic colour gradient light effect by recurrently selecting and mapping different linear portions of the colour gradient pattern to the array at regular time intervals.

* * * * *